(12) United States Patent
Brown et al.

(10) Patent No.: US 12,556,517 B2
(45) Date of Patent: Feb. 17, 2026

(54) REQUEST REDIRECTION WITH CONNECTIVITY PREPARATION

(71) Applicant: Charter Communications Operating, LLC, St. Louis, MO (US)

(72) Inventors: James Brown, Castle Rock, CO (US); Marek Dohojda, Centennial, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 76 days.

(21) Appl. No.: 18/195,932

(22) Filed: May 10, 2023

(65) Prior Publication Data

US 2024/0380737 A1  Nov. 14, 2024

(51) Int. Cl.
*H04L 9/40* (2022.01)
*H04L 65/102* (2022.01)

(52) U.S. Cl.
CPC ........ *H04L 63/029* (2013.01); *H04L 63/0876* (2013.01); *H04L 65/102* (2013.01)

(58) Field of Classification Search
CPC ... H04L 63/02; H04L 63/029; H04L 63/0209; H04L 63/0876; H04L 65/102
See application file for complete search history.

(56) References Cited

U.S. PATENT DOCUMENTS

2011/0107410 A1* 5/2011 Dargis ............... H04L 63/08
  726/11
2011/0251992 A1* 10/2011 Bethlehem ........... H04L 67/141
  707/610
2012/0303809 A1* 11/2012 Patel .................. H04L 67/1025
  709/228
2018/0109497 A1* 4/2018 Claes ................. H04L 63/166
2023/0049547 A1* 2/2023 Glazemakers ...... H04L 61/2567
2023/0093304 A1* 3/2023 Brasburg ............... G06F 9/541
  717/120

(Continued)

OTHER PUBLICATIONS

Wikipedia, Zero-day vulnerability, 7 pages downloaded Apr. 1, 2023 from https://en.wikipedia.org/wiki/Zero-day_vulnerability.

(Continued)

*Primary Examiner* — Boris D Grijalva Lobos
(74) *Attorney, Agent, or Firm* — Otterstedt & Kammer PLLC

(57) ABSTRACT

At a security gateway residing within a trusted computer network, a service request is obtained from an external client and is authenticated. In response, one instance of a plurality of available application instances is identified. The instances are hosted on a plurality of hosts having a plurality of firewalls, and the firewalls and the hosts reside within the network. The firewalls have been initially defaulted to block external access to all instances. A corresponding one of the hosts, within the trusted computer network, and corresponding to the identified one of the plurality of available application instances, is instructed to open a corresponding one of the firewalls to a network address corresponding to the external client. The external client is advised of a destination identifier and port corresponding to the opening of the firewall, to facilitate the external client communicating with the corresponding one of the hosts.

21 Claims, 9 Drawing Sheets

(56) References Cited

U.S. PATENT DOCUMENTS

2024/0333689 A1* 10/2024 Baruah .................. H04L 43/50

OTHER PUBLICATIONS

Wikipedia, Port knocking, 5 pages downloaded Mar. 10, 2023 from https://en.wikipedia.org/wiki/Port_knocking.

Wikipedia, Web service, 7pages downloaded Mar. 8, 2023 from https://en.wikipedia.org/wiki/Web_service.

Wikipedia, AAA (computer security), 2 pages downloaded Mar. 8, 2023 from https://en.wikipedia.org/wiki/AAA_(computer_security).

Wikipedia, API, 13 pages downloaded Feb. 12, 2023 from https://en.wikipedia.org/wiki/API.

Wikipedia, Denial-of-service attack, 27 pages downloaded Feb. 12, 2023 from https://en.wikipedia.org/wiki/Denial-of-service_attack.

Wikipedia, Firewall (computing), 5 pages downloaded Feb. 12, 2023 from https://en.wikipedia.org/wiki/Firewall_(computing).

Wikipedia, Load balancing (computing), 15 pages downloaded Mar. 8, 2023 from https://en.wikipedia.org/wiki/Load_balancing_(computing).

Geeksforgeeks.org, Computer Network | AAA (Authentication, Authorization and Accounting), Oct. 28, 2021, 8 pages.

Geeksforgeeks.org, TCP Connection Termination, May 12, 2022, 10 pages.

Geeksforgeeks.org, System Design Netflix | A Complete Architecture, Jan. 12, 2023, 17 pages.

die.net, knockd(1)—Linux man page, 5 pages downloaded Apr. 12, 2023 from https://linux.die.net/man/1/knockd.

What Are Load Balancing Methods?—Definition from Techopedia, 7 paged downloaded Mar. 11, 2023 from https://www.techopedia.com/definition/31290/load-balancing-methods.

Message from Netskope, Netskope Named a Leader in the 2022 Gartner® Magic Quadrant™ for SSE Report, 8 pages downloaded Apr. 5, 2023 from https://www.netskope.com/.

Ben Maddock, Port Knocking: An Overview of Concepts, Issues and Implementations, Global Information Assurance Certification Paper, SANS GIAC GSEC Practical, SANS Institute 2004 13 pages.

IETF, W. Eddy, Ed., RFC 9293 Transmission Control Protocol (TCP) 81 pages Aug. 2022.

What Does Application Gateway Mean?—Definition from Techopedia, 7 paged downloaded Feb. 12, 2023 from https://www.techopedia.com/definition/4189/application-gateway.

* cited by examiner

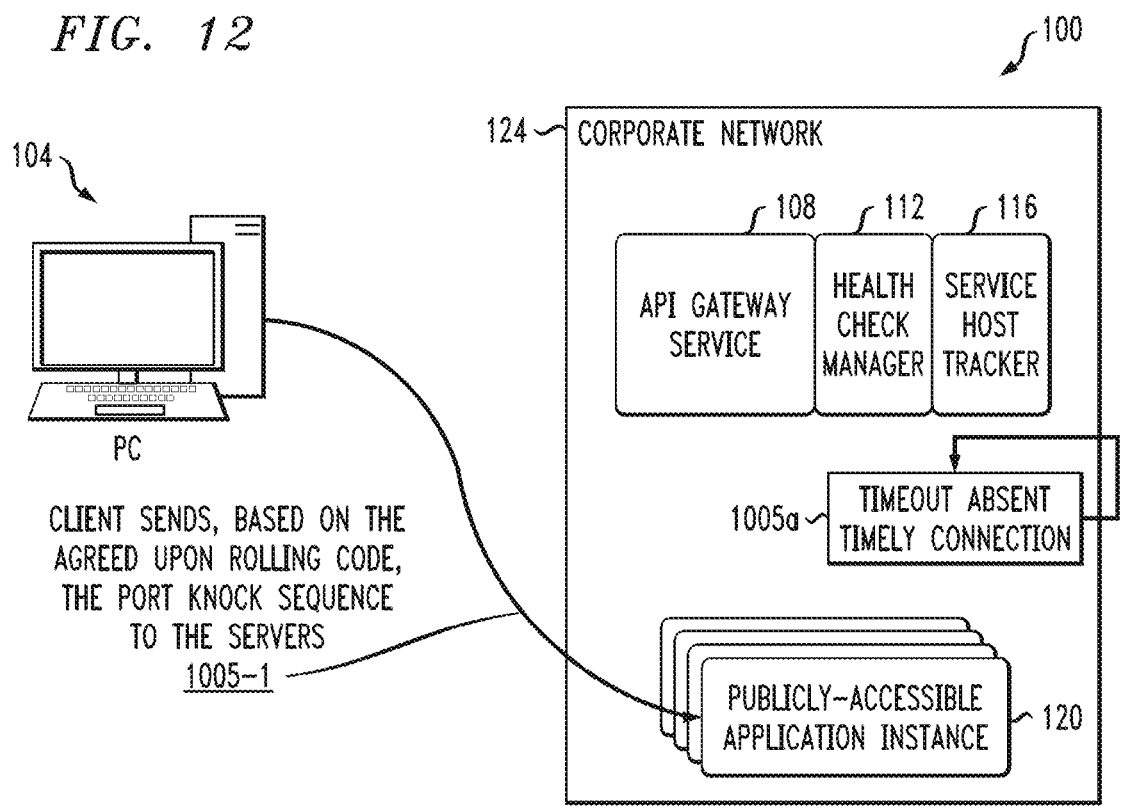
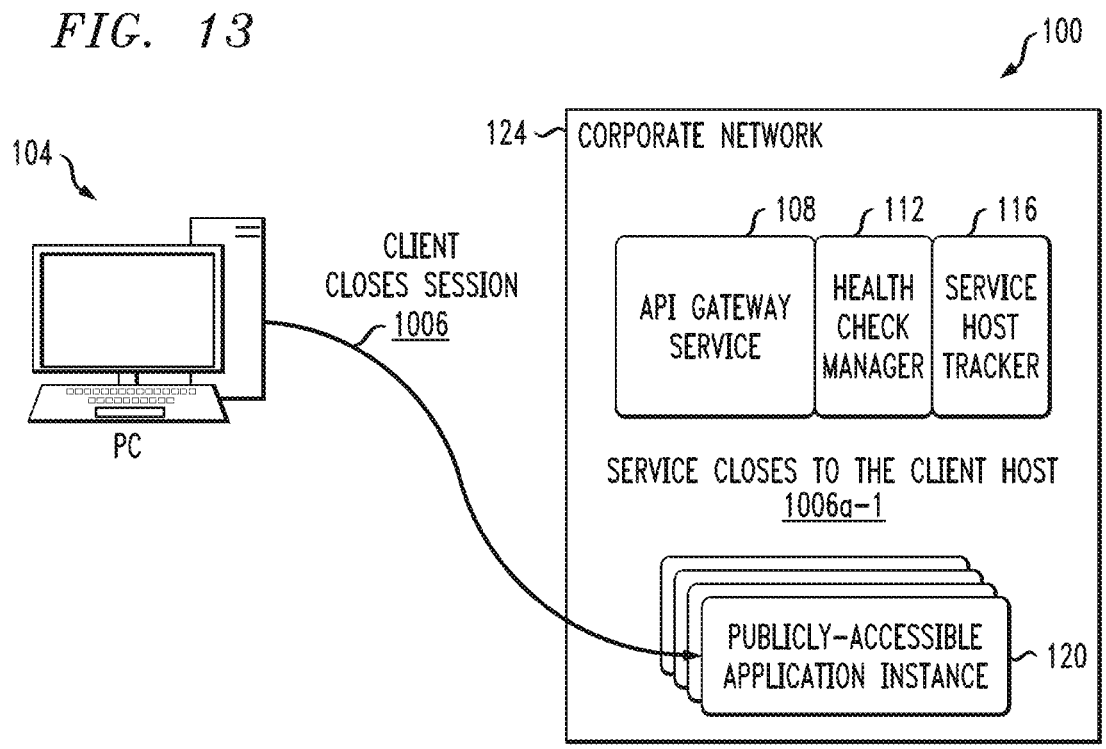

REQUEST REDIRECTION WITH CONNECTIVITY PREPARATION

FIELD OF THE INVENTION

The present invention relates generally to the electrical, electronic and computer arts, and, more particularly, to the prevention, detection and mitigation of network attacks and anomalies.

BACKGROUND OF THE INVENTION

A denial-of-service (DOS) attack is a cyber-attack in which a bad actor tries to make a computing resource unavailable by disrupting services of a host connected to a network; for example, by overwhelming the targeted machine or resource with "bogus" requests in an attempt to cause an overload condition and prevent some or all legitimate requests from being fulfilled. In a distributed denial-of-service (DDOS) attack, the incoming malicious traffic comes from many different locations.

A firewall is a computing system that monitors and controls network traffic to set up a barrier between trusted and untrusted networks (the Internet is an example of an untrusted network of networks). An application programming interface (API) is a form of software interface that allows two or more computer programs to communicate with each other. Load balancing, carried out by a load balancer, refers to distributing a set of tasks over a set of computing resources. AAA (Authentication, Authorization and Accounting) is a standard-based framework used to control who is permitted to use network resources (through authentication), what such persons are authorized to do (through authorization), and record the actions performed by such persons while accessing the network (through accounting). An application gateway or application level gateway (ALG) is a firewall proxy which provides network security.

Conventionally, a service (e.g., a web service) is protected by publicly exposing a port for the service and then authenticating requests for individual users. This, however, exposes the service to, for example, a denial of service attack, where an attacker is sending so much traffic that the system is overwhelmed or the system is exposed to the submission of malicious input, pattern after pattern, in an attempt to overcome the authentication security.

SUMMARY OF THE INVENTION

Principles of the invention provide techniques for request redirection with connectivity preparation. In one aspect, an exemplary method includes operations of obtaining, at a security gateway residing within a trusted computer network, from an external client, a service request; authenticating the service request using the security gateway; with the security gateway, responsive to the authenticating, identifying one instance of the plurality of available application instances. The plurality of available application instances are hosted on a plurality of hosts having a plurality of firewalls, the firewalls and the hosts reside within the trusted computer network, and the plurality of firewalls have been initially defaulted to block external access to all instances of the available plurality of instances. Further steps include, with the security gateway, instructing a corresponding one of the hosts, within the trusted computer network, and corresponding to the identified one of the plurality of available application instances, to open a corresponding one of the firewalls to a network address corresponding to the external client; and with the security gateway, advising the external client of a destination identifier and port corresponding to the opening of the firewall, to facilitate the external client communicating with the corresponding one of the hosts.

In another aspect, an exemplary system includes a trusted computer network, the trusted computer network in turn comprising a plurality of hosts having a plurality of firewalls, the plurality of hosts hosting a plurality of available instances of an application, the plurality of firewalls having been initially defaulted to block external access to all instances of the available plurality of instances; and a security gateway system, residing within the trusted computer network. The security gateway system in turn includes: a memory; and at least one processor, coupled to the memory. The at least one processor is operative to: obtain, from an external client, a service request; authenticate the service request; responsive to the authenticating, identify one instance of the plurality of available application instances; instruct a corresponding one of the hosts, corresponding to the identified one of the plurality of available application instances, to open a corresponding one of the firewalls to a network address corresponding to the external client; and advise the external client of a destination identifier and port corresponding to the opening of the firewall, to facilitate the external client communicating with the corresponding one of the hosts.

In still another aspect, another exemplary system includes a trusted computer network, the trusted computer network in turn comprising a plurality of hosts having a plurality of firewalls, the plurality of hosts hosting a plurality of available instances of an application, the plurality of firewalls having been initially defaulted to block external access to all instances of the available plurality of instances; and a security gateway system, residing within the trusted computer network. The security gateway system in turn includes: an application programming interface (API) gateway service; a health check manager; a service host tracker; and an authentication service. The application programming interface (API) gateway service, the health check manager, the service host tracker, and the authentication service are configured in data communication. The API gateway service is configured to obtain, from an external client, a service request; the authentication service is configured to authenticate the service request; the health check manager and the service host tracker are configured to, responsive to the authenticating, identify one instance of the plurality of available application instances; the service host tracker is configured to instruct a corresponding one of the hosts, corresponding to the identified one of the plurality of available application instances, to open a corresponding one of the firewalls to a network address corresponding to the external client; and the API gateway service is configured to advise the external client of a destination identifier and port corresponding to the opening of the firewall, to facilitate the external client communicating with the corresponding one of the hosts.

In a further aspect, an exemplary method includes obtaining, at a security gateway residing within a trusted computer network, from an external client, a service request; authenticating the service request using the security gateway; with the security gateway, responsive to the authenticating, identifying one instance of the plurality of available application instances. The plurality of available application instances are hosted on a plurality of hosts having a plurality of port knock listeners, the hosts and the port knock listeners reside within the trusted computer network, and the plurality of port knock listeners have been initially defaulted to block external access to all instances of the available plurality of instances. Further steps include, with the security gateway, instructing a corresponding one of the port knock listeners on a corresponding one of the hosts, within the trusted computer network, and corresponding to the identified one of the plurality of available application instances, to allow access to the external client upon receipt of a temporary rolling port knock sequence from a network address corresponding to the external client; and with the security gateway, advising the external client of the temporary rolling port knock sequence and a destination identifier and port, to facilitate the external client communicating with the corresponding one of the hosts.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine-readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., a security gateway including one, some, or all of an application programming interface (API) gateway service, a health check manager, a service host tracker, and an authentication service; optionally with a plurality of servers/hosts and/or firewalls and/or port knock listeners and/or operating system kernel elements; optionally with one or more external clients; optionally with internal and/or external network(s); and optionally with a load balancer, and the like) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Aspects of the present invention can provide substantial beneficial technical effects. For example, one or more embodiments of the invention achieve one or more of:

- redirection techniques for client requests that replace network-based forwarding techniques and reduce the public exposure of networked-based servers;
- prevention and/or mitigation of network attacks, such as DDOS attacks;
- improved network security for preventing and/or mitigating network-based attacks;
- reduction in request latency due to the lack of need for network-based forwarding (can improve the latency of requests, thereby improving responsiveness of services, by eliminating the usual go-between nature of a traditional load balancer);
- an architectural pattern that can significantly enhance the security posture of application deployment(s) by hiding services that would otherwise be exposed to an external network or network of networks, such as the Internet from unauthorized users, while allowing authorized users to access them freely, using a novel and unobvious arrangement that can advantageously be implemented by adapting existing components and protocols as described herein;
- implementation of novel and unobvious network attack and non-malicious configuration error prevention and mitigation techniques that can be easily integrated with existing system hardware, thereby providing a more robust prevention and mitigation mechanism without significantly increasing system overhead and complexity;
- further increase the security of conventional port knocking by avoiding a static code that could potentially fall into an attacker's hands;
- increase the usefulness of port knocking technology by automating the sharing of the rolling code with authorized clients;
- increase the pervasiveness of port knocking technology to increase the security of many publicly hosted services without inconveniencing end users; and
- ensure that only approved clients are able to see the destination port on the server, such that a secondary client hosted at the same Internet address is denied the ability to see the destination port on the server without also authenticating in the same fashion.

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIGS. 10-13 depict the processing of a service request from a client, in accordance with an example "port knocking" embodiment;

Figure 1:
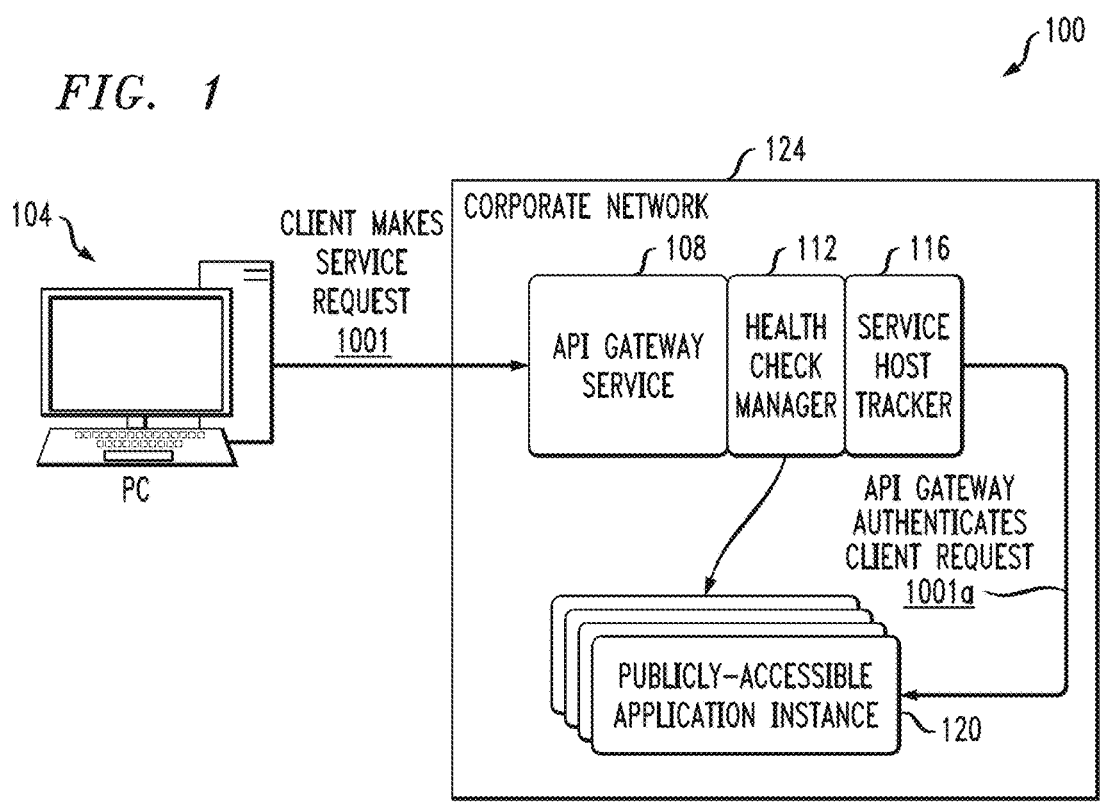
FIGS. 1-6 depict the processing of a service request from a client, in accordance with an example "firewall" embodiment.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Principles of inventions described herein will be in the context of illustrative embodiments. Moreover, it will become apparent to those skilled in the art given the teachings herein that numerous modifications can be made to the embodiments shown that are within the scope of the claims. That is, no limitations with respect to the embodiments shown and described herein are intended or should be inferred.

"Firewall" Example

One or more embodiments advantageously provide novel and unobvious aspects related to concepts and capabilities that have previously been implemented using an application load balancer, a firewall, authentication and authorization concepts and implementations, an application programming interface (API) and/or an application gateway. However, one or more embodiments replace the prior-art forwarding of the load balancer with a redirection, and/or replace the data transfer and the load balancer's isolation of the servers from the internet with a firewall that allows connectivity only to authenticated and authorized users. Thus, one or more embodiments do not use a load balancer. One or more embodiments provide a novel and unobvious arrangement of components that function differently than in the prior art, can advantageously be implemented by adapting existing components and protocols, and take on some functionality of a load balancer but in a manner that is more secure and/or otherwise improved as compared to a load balancer. Most conventional application implementations utilize a load balancer (either virtual or physical) in front of application instances and services, and then automatically balance the loads between the application instances and services (and the servers corresponding to the services). This is done by exposing a service publicly on the Internet and then forwarding (proxying) requests to various services behind the load balancer. This has the negative effect of exposing a plurality of load balancer endpoints to the Internet at all times, allowing an attacker to probe the services and corresponding load balancers directly, potentially using brute force to circumvent authentication performed by the load balancers, or taking advantage of a vulnerability in the service to gain remote access. Since the services are exposed at all times, the attacker can take an indefinite amount of time to attack the exposed service(s), leaving the service(s) to withstand the attack themselves. Note, while a load balancer does offer some protection to the servers behind it, the load balancer itself can be probed by a bad actor and in many cases will disadvantageously provide access to the servers.

A web application firewall (WAF) can help mitigate this issue by installing another proxy that will filter any malicious traffic that it can identify. While this improves the situation, it means that the WAF must withstand the attack and correctly differentiate between legitimate requests and attack traffic. While authentication information can be provided to the WAF to help make this determination, it still leaves both the WAF and the end-service with the responsibility to survive the attempted attack.

Thus, in one or more example embodiments, the load balancer is removed from the system, and its functionality is replaced with a redirection operation rather than proxying the traffic via the load balancer. In concert, in one or more embodiments, each publicly exposed service instance is completely firewalled by default until an authenticated request is provided by a gateway service to command the service and corresponding server(s) to expose an open port to only the authenticating client. This means that an attacker would be unable to discover a host (such as the server) without actually being authenticated and authorized to see such host. The use of load balancers to forward/gate traffic to hosts is known; advantageously, one or more embodiments move gating to the hosts. Decreased request latency is a corresponding advantage of one or more embodiments. Inline load balancing is also beneficially provided in one or more embodiments.

In one example embodiment, the functionality of the load balancer is moved to a software-based gateway service which tracks all extant application instances, and maintains consistent health checks to ensure that the services and corresponding servers are working properly. Then, when a client makes an authenticated request of an application programming interface (API) gateway service, the gateway requests the next available service instance (as identified by, for example, a host Internet Protocol (IP) address and port identifier) and returns that to the client. Thus, services, by default, do not respond to requests directly. Access to the service is accomplished through either an onboard or outboard firewall that the software-based gateway service can control, where any traffic to the service instance's service port is simply ignored until a service host tracker tells the firewall to allow the traffic. For example, in one or more embodiments the software-based gateway service (API Gateway 108, discussed further below) commands the firewall to open the port to the requester, and to return the destination IP and port to the requester. Thus, in one or more embodiments, gateway 108 commands the firewall to open ingress from the client (i.e., open the port to the requestor and return the destination IP and port to the requester) and optionally tells the server that another authenticated connection is anticipated and to service it.

Once the service host tracker has chosen an available service instance, it will notify that instance to start allowing traffic from the client making the request. Next, the client will open a connection to that service, and will conduct its tasks with that service as usual. When the session is over (either because the session is closed by either the client or the server, or because the connection expires due to inactivity), the service firewall will be closed to that client until the next authenticated session arises.

Network-based services are typically exposed on wide-area networks, such as the Internet, and are often exposed in such a way that they can be detected easily. In general, the Internet protocol drives this behavior, in part, by default. Advantageously, in one or more exemplary embodiments, a service is hidden until it is ready to be used. For example, to watch a particular video (hosted by a given website) using an application or smart device on which a user has been authenticated, the service is exposed once the user has been authenticated to use the service. The service is only exposed to the device having the user's source port.

As noted above, in a conventional system, a load balancer checks the health of the services and servers, and sends a given request to one or more of the servers, where the distribution of requests to the servers is distributed in a manner that balances the load between the servers. Conventionally, the entire request is forwarded to the server(s). In one example embodiment, there is no forwarding; instead, a redirection is performed and the client makes a request of the given service to, for example, stream a video. The system will look for a server that is hosting the desired content, make sure the server is healthy, and send the IP address and port number of that server to the client. Then, the client is simply able to open a new request to the service because, in the meantime, the gateway that is preparing the connectivity has instructed the server that a request from the given client is coming in with a certain source IP address, that only the given client is to be allowed through, and that the server is to only accept a connection from the given client. Thus, the fleet of servers are "invisible" to any attacker and only a single specific "hole" in the firewall is opened to allow just the authorized connection to enter. For the avoidance of doubt, this should not be taken to imply that one or more embodiments preclude one server from responding to multiple active requests. Instead, the firewall simply only allows the requests that are authorized, but multiple requests can be serviced by the same server in one or more embodiments. Moreover, port scans, the discovery of open ports, and the infiltration of ports is prevented as there are no visible servers to infiltrate. In essence, there is no forwarded traffic; only redirected traffic. It is worth noting that many video services generally have one site to provide the user interface, find videos, select which video the customer desires, and the like; and then separate servers used behind the scenes to actually stream the video data.

In general, a conventional load balancer performs a health check of all of the servers behind it to make sure that they are live and healthy before forwarding traffic to them. In one example embodiment, the health checks are performed by the gateway service 108 which simply checks the health of the servers and indicates which servers of the fleet of servers are alive and available to have traffic redirected to them. In one or more embodiments, the load balancing is implemented as a separate service that tracks sessions with its clients (e.g., client 104, discussed further below). Now, to provide access to, for example, a given website (for example, the website on which it is desired to watch the video as mentioned above), a manager (e.g., tracker 116, discussed further below) redirects the request to one of the set of healthy servers and instructs that server to allow the connection. The client will then be redirected to open the connection with that server.

Accordingly, in one or more embodiments, the gateway that is providing the connectivity that is managing the traffic interaction indicates to the client that the gateway has advised the server that the client is coming, that the client knows where to go, and then the client can connect and interact. It should be noted that there is the potential for a race condition here. For example, the client may make the request before the server is prepared for it. In this case, the client should retry the connection some number of times, until a timeout is reached. Another option is to verify that the server is ready to receive the connection before providing the destination IP/port (and optionally port knock code) to the client. This option trades an improvement in reliability for a reduction in connection speed.

FIGS. 1-6 depict the processing of a service request from a client 104, in accordance with an example embodiment, generally designated as 100 (client 104 can be thought of as external to the remainder 100 of the system; alternatively, an overall system can be thought of as also including one or more clients). In one example embodiment, a service host tracker 116 monitors and understands the fleet of publicly-accessible application instances 120 (residing on corresponding servers as discussed below with regard to FIG. 7). A health check manager 112 verifies that the fleet of servers hosting the application instances 120 are healthy and responding to requests internally. The API gateway service 108 is configured to accept requests from the client 104 and will also have been "primed" by the requested website that is granting the permission. For example, when an API relies on cached data, the cache can be primed so that it contains data likely to be requested in normal operation, allowing same to be served more quickly by the API, rather than having to wait until the common data is requested and pulled from a slower backing store.

To reiterate, one or more embodiments advantageously replace the forwarding behavior of a common load balancer with a redirection and access control by firewall, providing security and/or latency benefits in one or more embodiments. Another embodiment integrates this behavior into the system kernel (operating system on server and devices) such that by default these special "protected ports" are closed, and requires that they receive the source IP to allow connectivity, and potentially a knock code. This aspect eliminates the need for a firewall, and makes the process even more efficient.

In a non-limiting example, elements 108, 112, 116, 120 reside within a "trusted network," such as a corporate network 124. Note that a "corporate network" is a non-limiting example of a "trusted network" which is used herein to refer to a network and/or internetwork that is under control of an entity or a group of cooperating entities, which it is desired to protect from possible malevolent outside actors. An example of a group of cooperating entities could be an infrastructure as a service (IaaS) provider and one or more of its customers. Referring specifically to FIG. 1, at step 1001, the client 104 submits a request to the API gateway service 108. In step 1001a, the API gateway service 108 authenticates the client request. In an embodiment leveraging multi-factor authentication to authenticate the client request, step 1001 includes a required second form of authentication (such as a software token if user name and password are also provided).

In one or more embodiments, where the API gateway service cannot authenticate the client's request, the connection is refused. For example, in FIG. 1, if the API gateway is unable to authenticate the client request at 1001a (e.g., using AAA service 132), instead of proceeding with step 1002 in FIG. 2, the connection is denied.

Figure 2:
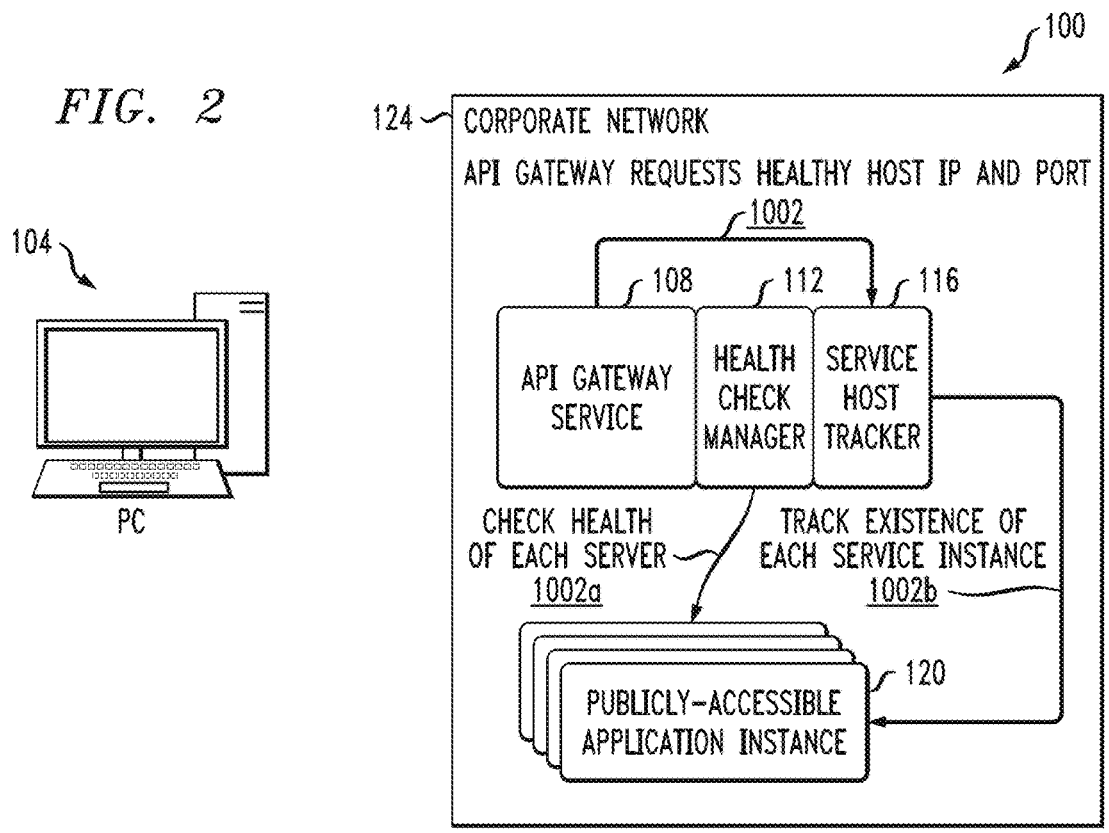

As depicted in FIG. 2, in one example embodiment, the API gateway service 108 submits a request for the host IP address and port identifier of a healthy host to the service host tracker 116 and checks whether there is a service to process the request (step 1002). The health check manager 112 checks the health of each server associated with the identified service of the publicly-accessible application instances 120 at step 1002a and, if the service is healthy, selects the appropriate service and corresponding server. Meanwhile, as described above, the service host tracker 116 monitors the fleet of publicly-accessible application instances 120 at step 1002b.

Figure 3:
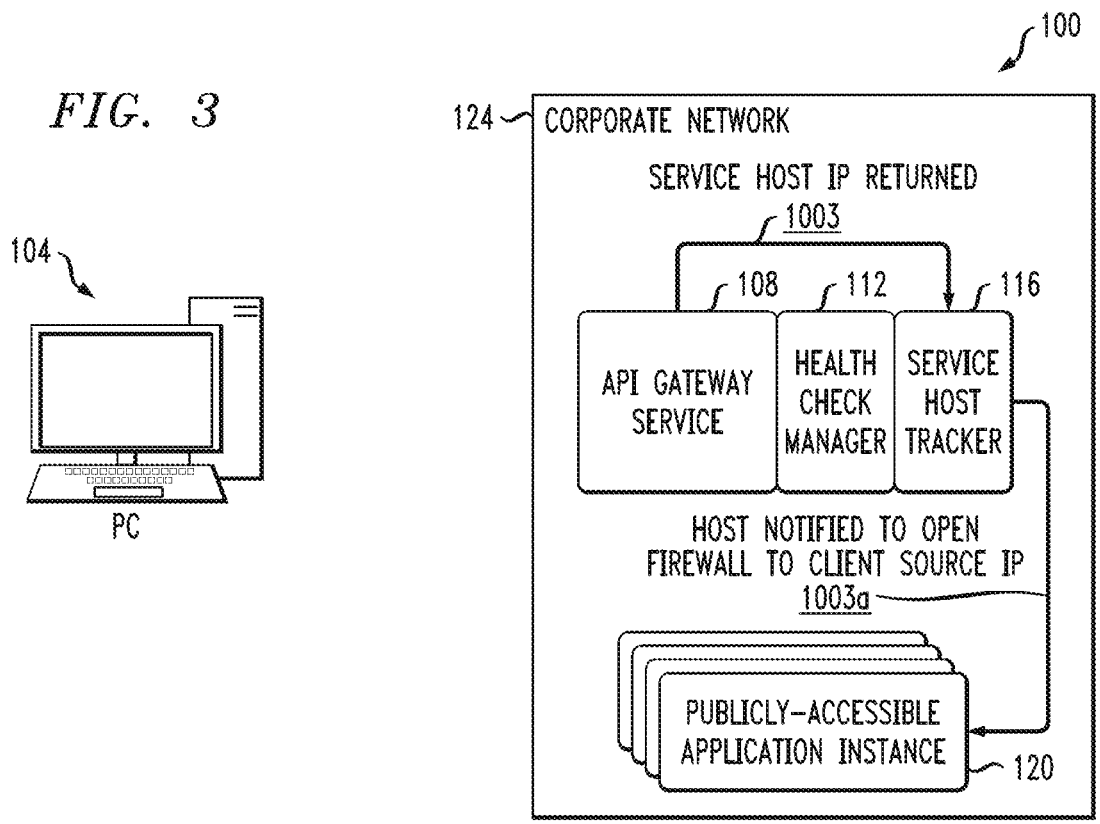

As depicted in FIG. 3, in one or more embodiments, the service Host IP address is returned by the API gateway service 108 to the service host tracker 116 (step 1003) and the host of the appropriate application instance 120 is notified to open the firewall(s) with the client source IP address at step 1003a. Thus, the client 104 will have a destination IP address and a destination port to connect on, and (just) that connection can be opened.

Figure 4:
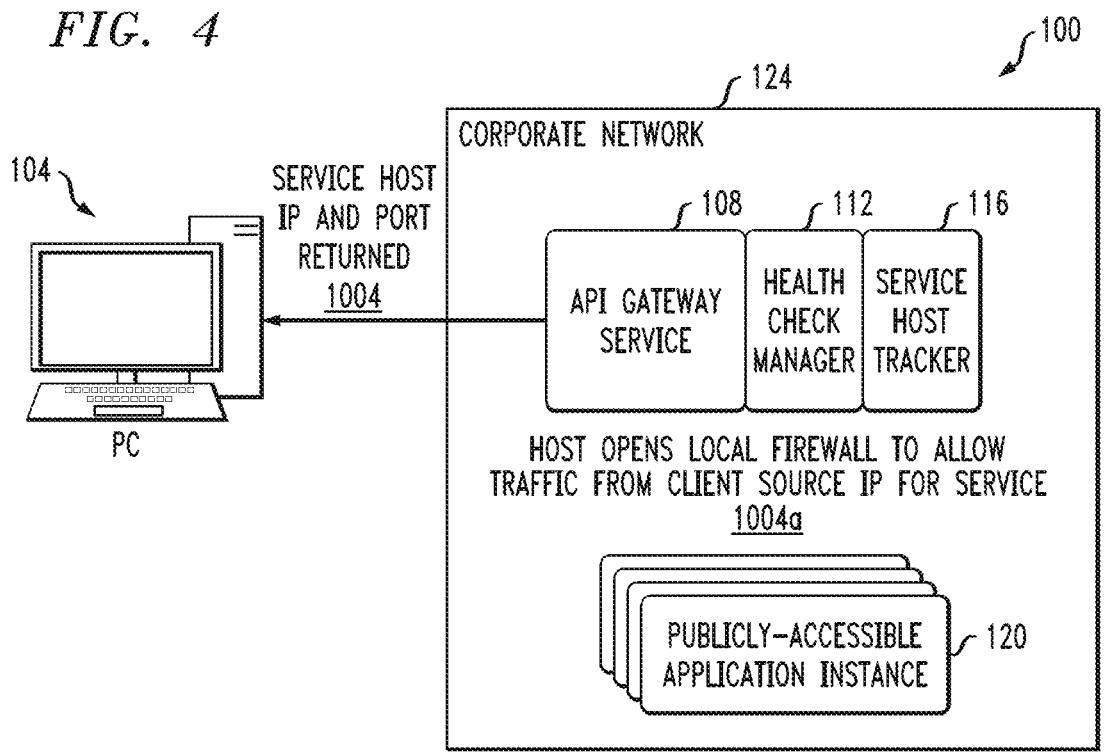

As depicted in FIG. 4, the API gateway service 108 returns the host IP address and port number to the client 104 (step 1004), and then the host opens its local firewall at step 1004a and allows the traffic from the client 104 to pass through to the service, based on the client source IP address. Stated in another way, in step 1004, the API gateway service 108 issues the redirection to the client 104. Re-direction refers to a process wherein a request is made to a web site, which the web site does not want to directly serve. In a non-limiting example, the web site sends an HTTP response code 301 or 302 (redirect) with a new URL to redirect to; the browser automatically redirects to the new URL. Recall that in step 1003a, a command was issued by the service host tracker to the firewall protecting the server to allow the connection. As part of step 1003a, a session authentication token can be sent from the service host tracker to the service indicating that the session is an authenticated session. Use of the HTTP protocol is a non-limiting example. In another non-limiting exemplary aspect, a client designed to interact with a service could use any communication mechanism to accomplish the redirection, if the client were not using a traditional web-browser. For example, if the client was a mobile app, then the developer could define any arbitrary redirection mechanism.

Figure 5:
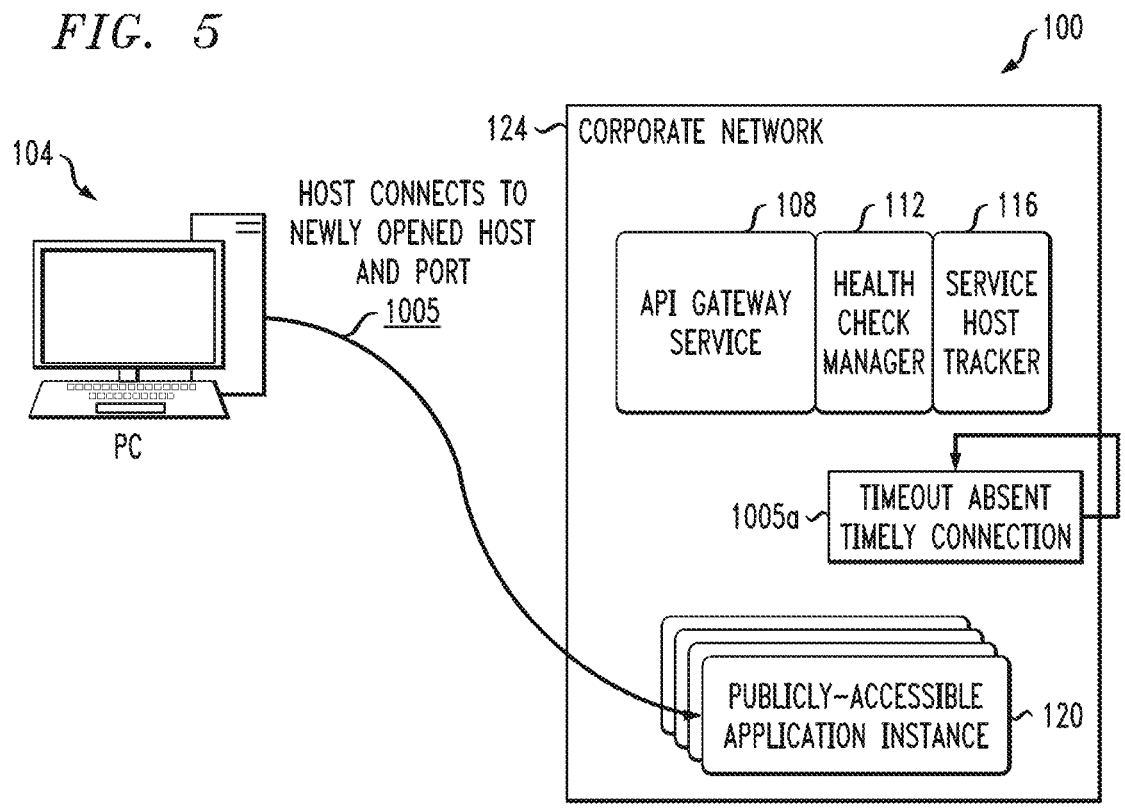

As depicted in FIG. 5, in step 1005, the host connects to the newly opened port and then carries out the appropriate task(s), such as, for example, streaming a movie to the client 104 or a mobile service (e.g., an application on a mobile device as an alternative to watching in a browser, wherein the mobile device becomes the client).

Optionally, in one or more embodiments, at 1005a, note a timeout of the session at the server side if the client does not connect to the server within a configurable time frame, such as 5 minutes (NOTE: this aspect can be applied regardless of whether a firewall or port knocking are used to allow connectivity). For clarity, in one or more embodiments, the timeout achieves the condition that the server disables access from the associated client and the client is forced to re-authenticate and re-authorize with the server.

Figure 6:
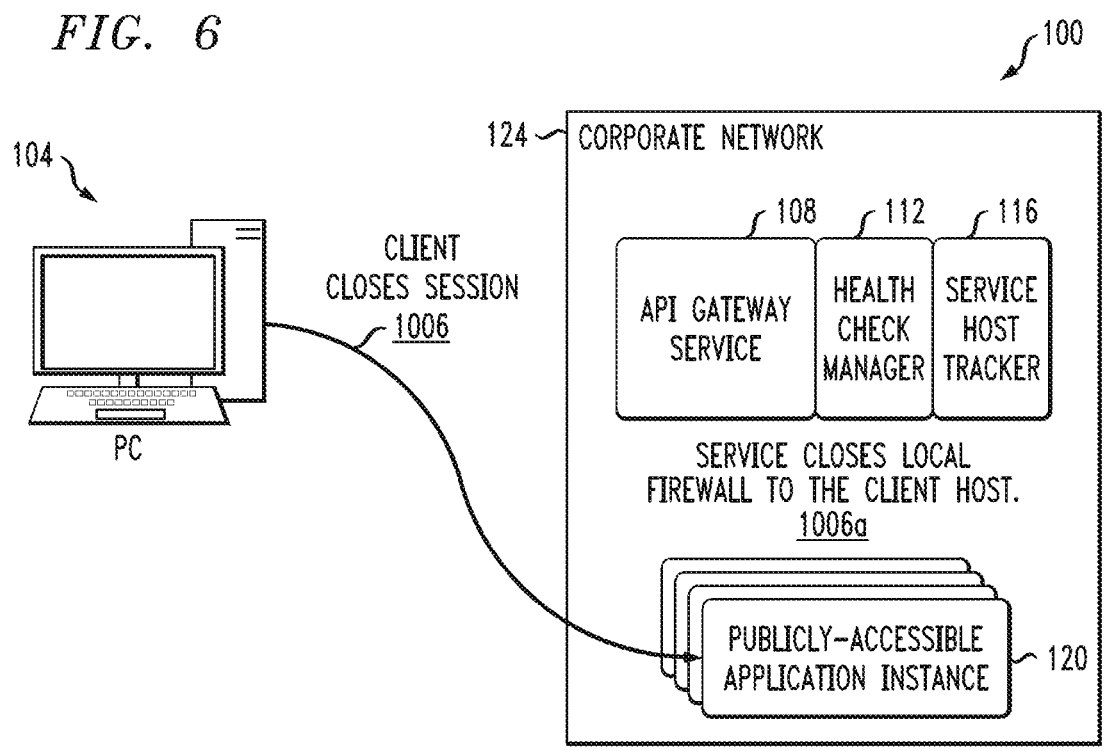

As depicted in FIG. 6, when the service is concluded, then the client 104 or the server hosting the particular publicly-available application instance 120 closes the session (step 1006), and the "hole" in the firewall is closed such that the client 104 can no longer see that port (step 1006a). Thus, the service/server has only been exposed to the one user and then closed; from an outsider's perspective, the user did not see the server and never will see anything even if the user attempts to make a request while that session is open (since the user's source IP address will not be valid and the server will not be open to that IP address). Again, this aspect does not preclude multiple parallel active sessions from multiple users, only that users who are not authenticated and authorized cannot detect the server.

Generally, between FIG. 5 and FIG. 6, traffic is exchanged between client 104 and the server hosting the particular publicly-available application instance 120; streaming of a movie is just one non-limiting example of exchanging traffic.

In one or more embodiments, the service host tracker 116, the health check manager 112, and the API Gateway service 108 are software components that reside within the boundaries of the trusted network (e.g., corporate network 124) and interface with clients 104 that are trying to access services.

Figure 7:
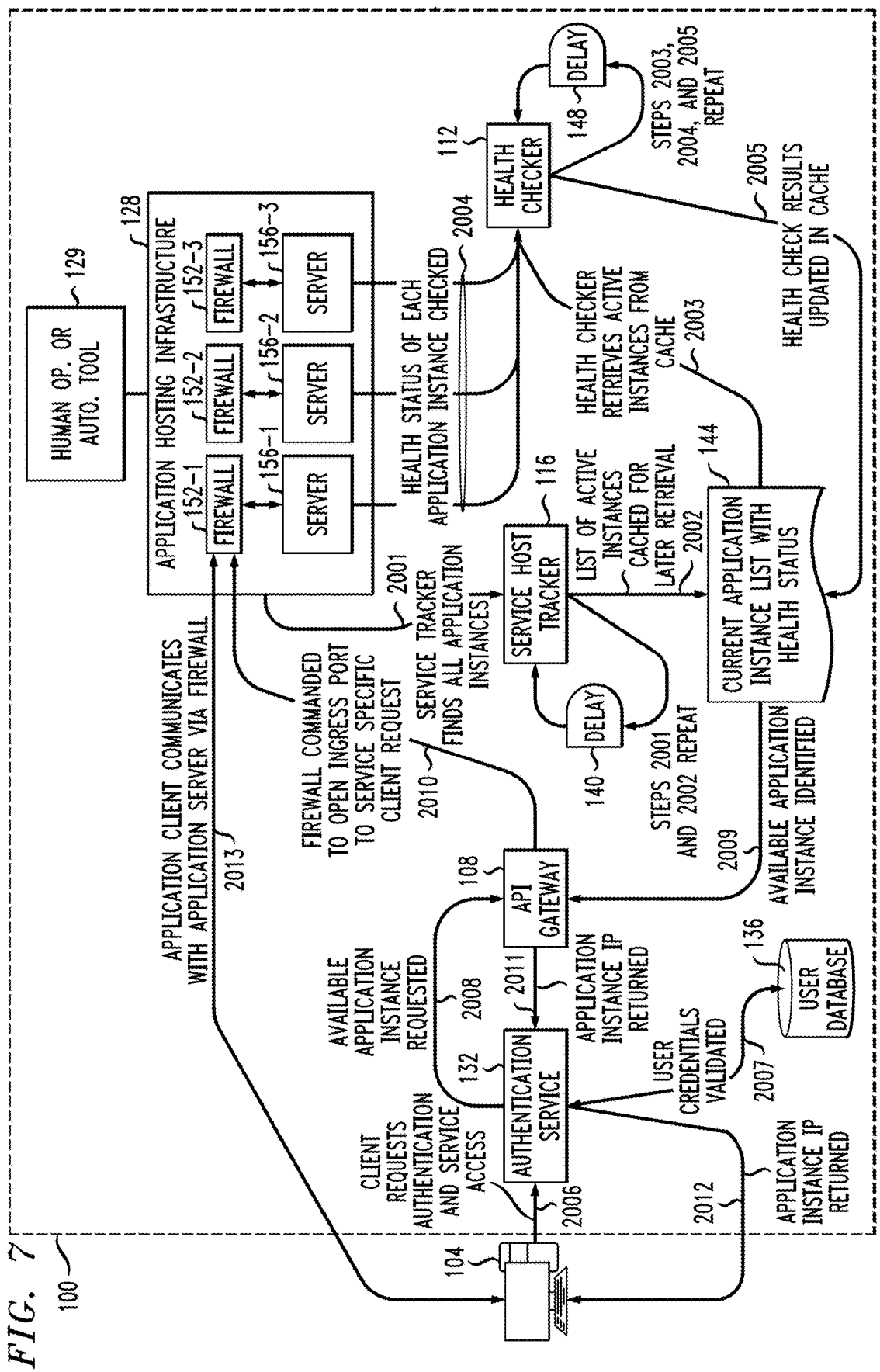
FIG. 7 is a consolidated view of the processes of FIGS. 1-6, in accordance with an example embodiment.

FIG. 7 is a consolidated view of the processes of FIGS. 1-6, in accordance with an example embodiment, which also provides additional exemplary details. In one example embodiment, the service host tracker 116 finds and monitors the fleet of publicly-accessible application instances 120 (seen in FIGS. 1-6) on an application hosting infrastructure 128 (operation 2001) and caches a list of active instances 144 (operation 2002). (It is noted that operations 2001 and 2002 are periodically repeated with a specified delay 140.) In the example of FIG. 7 the infrastructure 128 includes three servers 156-1, 156-2, and 156-3, each with a corresponding firewall 152-1, 152-2, 152-3. Other embodiments can have more or less than three servers and corresponding firewalls. The health check manager 112 retrieves the list of active instances 144 (operation 2003), checks the health status of the fleet of publicly-accessible application instances 120 on the application hosting infrastructure 128 (operation 2004), and updates the list of active instances 144 with the discovered health status (operation 2005). (It is noted that operations 2003-2005 are periodically repeated with a specified delay 148.) The client 104 requests authentication and access to a service via an authentication service 132 (operation 2006). The authentication service 132 accesses a user database 136 to validate the user credentials (operation 2007) and, in response to a proper authentication of the user, requests an available application instance of the application instances 120 (seen in FIGS. 1-6) from the API gateway service 108 (operation 2008). The API gateway service 108 accesses the list of active instances 144 to identify an available application instance (operation 2009), commands the appropriate firewall (e.g., 152-1; generally, the firewall corresponding to the server on which the instance resides) to open an ingress port to service the request of the client 104 (operation 2010), and returns the application instance IP address to the authentication service 132 (operation 2011). The authentication service 132, in turn, returns the application instance IP address to the client 104 (operation 2012). The client 104 then communicates with the application instance on a server 156-1 of the application hosting infrastructure 128 via the appropriate firewall 152-1 to coordinate performance of the requested service (operation 2013).

One or more exemplary embodiments use standard communication protocols such as TCP/IP. The skilled artisan will be generally familiar with application programming interfaces (APIs), and, given the teachings herein, will be able to adapt known aspects of APIs to implement one or more embodiments. Any suitable programming language can be used for developing software components of the invention, as long as the resultant executable code can interact on the network. A non-limiting example of an application that can be provided by the publicly-accessible application instances 120 is a watch TV application, such as the kind that allows watching internet protocol television (IPTV) on a mobile device, but in general, the instances 120 can be of any kind of application. Indeed, one or more embodiments are generally applicable to any kind of services provided on the web.

In one or more embodiments, to address detection, traffic monitoring can be used on the hosts (i.e. servers 156-1, 156-2, 156-3 hosting instances 120) to detect when an authorized connection request is made to the endpoint. This advantageously addresses the problem of someone with an authorized client extracting the redirect destination and attempting to reuse it from an unauthorized host. One or more embodiments limit the number of authorized connections from the authorized party so that reuse can be further prevented. In another aspect, the protocol used to transmit the destination IP/port and port knock code are encrypted and protected with mutual TLS authentication to ensure that unauthorized parties cannot eavesdrop on the transmission (it may be generally advisable to include this aspect in one or more embodiments). Also, one or more embodiments can improve the latency of requests, thereby improving responsiveness of services, by eliminating the usual go-between nature of a traditional load balancer.

As noted above, one or more embodiments provide an architectural pattern that can significantly enhance the security posture of application deployment(s) by hiding services that are exposed to an external (typically, untrusted) network or network of networks, such as the Internet from unauthorized users, while allowing authorized users to access them freely, using a novel and unobvious arrangement that can advantageously be implemented by adapting exiting components and protocols as described herein. For example, if using HTTP protocol requests, then a 301 redirect can be used to redirect communication to the now-opened server and port (if using other network protocols that do not have an integrated redirect capability, the client code can include specific support to automatically redirect requests). Again, the use of HTTP response code 301 or 302 (redirect) is a non-limiting example, and other approaches are possible, such as the case where a client designed to interact with a service could use any communication mechanism to accomplish the redirection, if the client were not using a traditional web-browser. For example, if the client was a mobile app, then the developer could define any arbitrary redirection mechanism.

It is worth noting that a traditional load balancer could be protected in the same manner as the servers and used in concert. That is, between the trusted and untrusted networks, a traditional load balancer could be protected in the same fashion as the publicly-accessible application instances 120. Thus, it is also possible to have one or more embodiments wherein, instead of having servers exposed to the Internet, a load balancer is provided in front of the servers and is exposed in same fashion. Doing this would eliminate latency-reduction benefits but would retain security benefits. In another aspect, some embodiments of the invention could fully implement a load balancer and include both the initial embodiment as well the port knocking capabilities as separate configurations. That is to say, aspects of the invention could replace load balancing functionality without the use of a load balancer.

Figure 14:
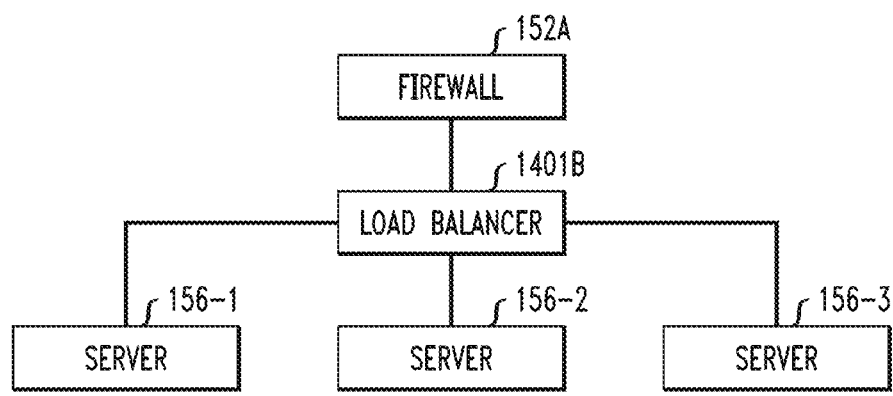
FIG. 14 shows an alternative configuration making use of a load balancer.

Referring to FIG. 7 and FIG. 14, the load balancer 1401B can be provided one layer below the firewall, i.e., between a single firewall 152A and the servers 156-1, 156-2, 156-3. In this aspect, the single firewall 152A protects the load balancer and the servers 156-1, 156-2, 156-3 behind the load balancer are directly open to the load balancer. Further, in this aspect, the client 104 talks to a single endpoint; namely, the load balancer 1401B. In this aspect, the processes depicted in FIGS. 1 and 2 can be carried out as described above. In FIG. 3, instead of the host tracker 116 notifying the instance 120, notify the single load balancer 1401B (or a firewall 152A protecting the load balancer 1401B). Rather than the host, the load balancer 1401B opens up to allow the traffic and forwards it to the appropriate application instance 120 on server 156-1, 156-2, 156-3. In the aspect of FIG. 14, the flows in FIGS. 3-6 are different in that the session is with the load balancer 1401B protected by its firewall 152A and the load balancer picks whatever instance 120 to use based on round robin or other known load balancing techniques. It is worth noting that, in the embodiment of FIG. 14, the gateway no longer has responsibility for choosing a server, nor for checking the health of the servers. The load balancer (as it traditionally does) is responsible for those tasks. The benefit comes in terms of the firewall/port knock listener being locked down until the gateway commands the firewall/port knock listener to allow access to a specific client IP/port knock code.

Note also that a single load balancer could be located upstream of multiple firewalls and servers; such a configuration would require that the load balancer be designed such that port knock requests would be able to be passed to the specific host (which is not possible on a traditional load balancer), that the load balancer be further aware of which server was chosen by the gateway service to allow the traffic to reach that server, would expose the load balancer to attack, and would eliminate the benefit of reduced latency. Thus, while this approach might be feasible, it would likely be less beneficial than other embodiments. Thus, in some cases, instead of the client 104 directly accessing the servers 156-1, 156-2, 156-3 hosting the instances 120, there is an intervening load balancer. The load balancer is protected by the port hiding aspect as described herein. Once the port is open, the intervening load balancer will then forward traffic to one of the servers 156-1, 156-2, 156-3 hosting the instances 120. In this aspect, the load balancer would likely need to: 1. Track the health of each server through a side-channel not exposed to the client communication path; and 2. Directly forward all traffic to a chosen firewall/port knock listener, regardless of whether the traffic conforms to any relevant IETF (Internet Engineering Task Force) RFCs (requests for comments). It may not be possible to track and manage communications sessions (required to allow recurring requests over the same TCP connection) in this case because the load balancer may not be able to differentiate between knocking and an existing session. Such a design would accordingly likely require research and significant testing. This aspect thus provides a more complex way to identify and choose a target server, with added latency, and would not eliminate the API gateway. Further, this aspect likely requires a resolution regarding the side-channel connection to the server to check health to explain how the server is chosen by the load balancer, and regarding the lack of RFC-compliance.

"Port Knock" Example

Public services exposed on the Internet are typically open at all times to attackers, and as a result must at times withstand attacks, both in terms of traffic volume as well as those that attempt to leverage known vulnerabilities or unknown vulnerabilities (zero-day; i.e., a vulnerability that is unknown to the public but known to malicious actors and can be leveraged by an attacker to access unauthorized services) to gain access. In order to hide these services from would-be attackers, while still allowing access to authorized clients, a well-known technology, called port knocking, can be used. Port knocking allows clients to send specific packets in a specific sequence to a known Internet address, and if the correct sequence is detected, the port will then be exposed to the requesting user. Port knocking is a technique that prevents the exposure of a service to the outside world unless a correct signature is provided; the service is hidden unless the signature is known. For example, a signature may be three packets having three different port numbers submitted in the correct sequence. If the three packets are sent in the right sequence, then the service is exposed and can be connected to. Thus, it will be appreciated that port knocking can be used as a substitution for a firewall, or an adjunct thereto.

One or more embodiments couple known rolling code technologies, such as those used to implement rolling PIN codes for multi-factor authentication, with port knocking. In a non-limiting example, replace firewalls with port knocking protection using rolling codes. In this aspect, the rolling codes are added as part of what the API Gateway shares with the servers. The rolling code is sent along with the authorization, and the server is advised to await a port knock with the rolling code and then (i.e., upon verification of correct rolling code) to accept access only from the appropriate source IP address. As noted, one or more such embodiments provide one or more of the following benefits:

Further increase the security of conventional port knocking by avoiding a static code that could potentially fall into an attacker's hands;

Increase the usefulness of port knocking technology by automating the sharing of the rolling code with authorized clients;

Increase the pervasiveness of port knocking technology to increase the security of many publicly hosted services without inconveniencing end users;

Ensure that only approved clients are able to see the port, such that a secondary client hosted at the same Internet address is denied the ability to see the port without also authenticating in the same fashion.

Figure 9:
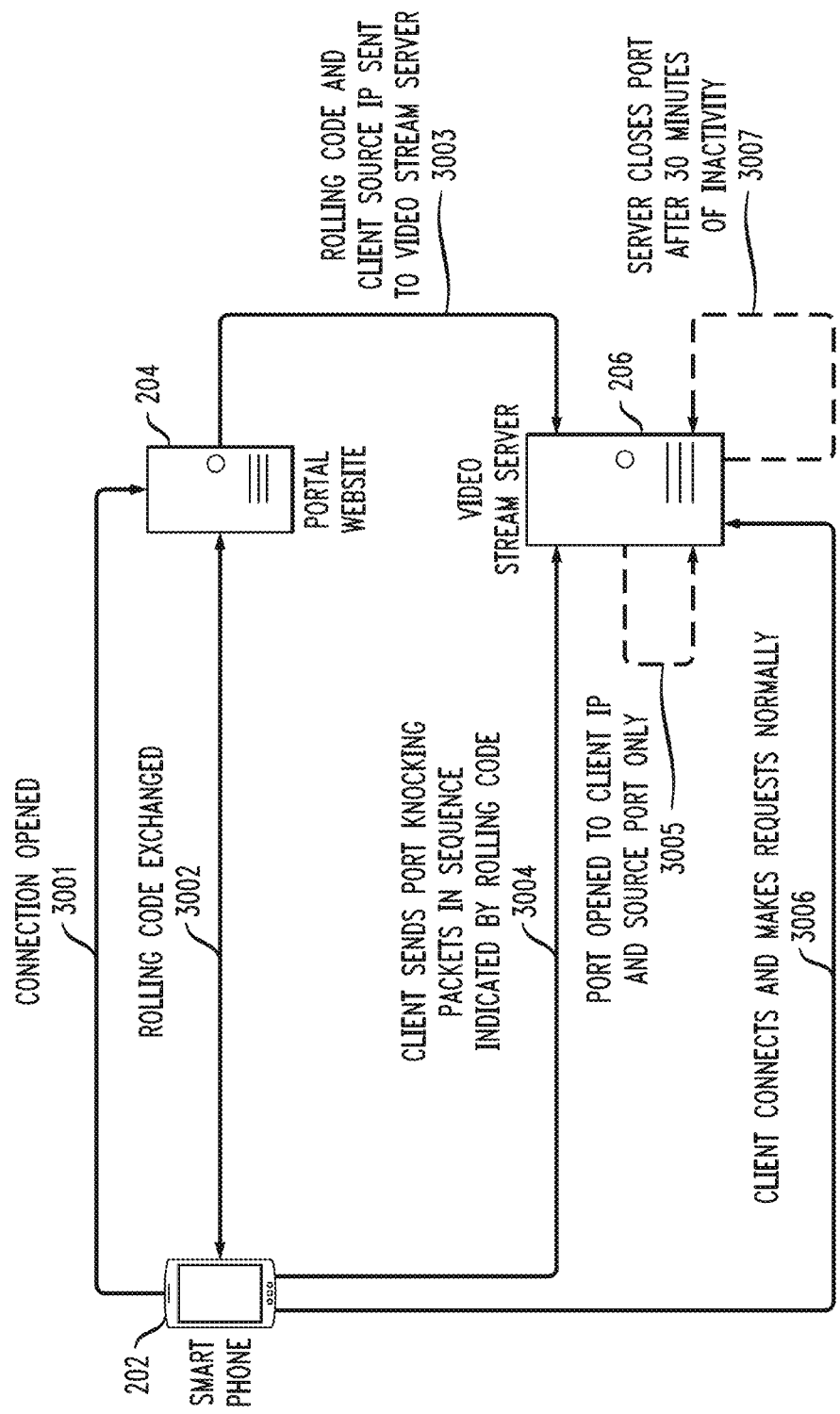
FIG. 9 depicts "port knocking," according to another aspect of the invention.

Aspects of this enhanced port knocking can be employed in a stand-alone manner, or can be used in conjunction with aspects of the invention as discussed with regard to FIGS. 1-7 to provide additional security. Referring to FIG. 9, in one embodiment of this port knocking aspect, a public site, such as portal website 204, that provides access to another site (such as an application for watching television, which hosts a website publicly, but points the application at another location, such as video stream server 206, to view video content) allows the user to register a rolling code with the primary site. The user will have a client device, such as smart phone 202. In step 3001, a connection is opened between the client 202 and the portal web site 204. In step 3002, responsive to the opening of the connection, the rolling code is exchanged (provided from the portal web site 204 to the client 202). The mathematical basis for the rolling code, as well as the source Internet (IP) address of the client, are shared with the secondary site 206 in step 3003. Server 206 has a service port that is hidden by default. In step 3004, the client 202 presents the rolling code to the site 206 by sending transmission control protocol (TCP) packets to the ports indicated by the rolling code. In an alternative embodiment, the client 202 encodes the source port of the authorized request in the port knock packets, so that only that source port may be allowed to access the port (preventing another client at the same Internet address from seeing the port without similar authorization). Stated differently, some embodiments only allow a port knock from the appropriate source IP address to succeed. For example, in FIG. 9, the port knocking client 202 encodes the source port of the authorized request in the port knock packet. The smart phone or other client 202 includes data in the packets that identifies the IP Address from which it is sending the packets (or a suitable identifying token is included). Furthermore in this regard, while the smart phone or other client 202 will know its own source port, that port will likely be translated through network address translation in many cases before reaching the server. The server can identify the port that it sees from the client. Consider the case where a router is present on the home network and the smart phone reaching the Internet through it. Because of the use of network address translation (Network Address Translation (NAT) is the process of mapping an internet protocol (IP) address to another by changing the header of IP packets while in transit via a router; as used herein, Network Address Translation or NAT is used to encompass both port and IP address translation), in one or more embodiments, the client's own source port is not included in the packets and the IP address is employed. In some cases, a client will establish multiple connections to a service for various purposes. In order to prevent another client on the same network from being able to leverage the same connection to the server, a mechanism would be required to count the set of connections, and to allow that many connections to be established with the same port knock code. Thus, consider a case where multiple connections are emanating from the same IP Address. This may be acceptable; however, some control is needed—for example, only allow 5 or 10 connections. There may be several computers behind the home router all using the IP address of the router. For example, suppose a connection is made to a server from a home network. All the connections go through the home router. The router performs network address translation (NAT). This means that all the home traffic goes out through a single IP Address, but with different source ports. It will not necessarily be feasible to identify the source port of the client; the client won't even know what source port will be seen on the server side because the source port is being renumbered as part of NAT. When a new connection is started from within the home, a new source port arrives. Therefore, one or more embodiments do not employ the source port to identify the (authenticated) client, but rather the IP address of the home router. Thus, while the source port is part of the connection request from the client to begin with, this source port can be changed from the client that originally made the request via a router or gateway device performing network/port address translation.

Furthermore in this regard, in some instances, the smart phone is not identified as a particular device but does allow the connectivity. For example, Person A's phone (generally, client) goes to Person B's server and informs Person B's server of the IP address of Person A's phone. Person B's server adds this ID into the port knocking pattern, and then Person A can connect. In an alternative, instead of Person A identifying his or her phone to Person B's server, Person A's phone tells Person B's server "this is my token from my phone." In one or more embodiments, this is dynamically generated in a manner similar to Multi-factor Authentication (MFA). In some cases, when the smart phone 202 sends the knock sequence to the video stream server 206, in addition to the knock sequence, smart phone 202 sends some kind of an identifying token within the port knock packets. In another aspect, the portal web site 204 sends the rolling code and the client source IP of client 202 to the video stream server 206. Conventional port knocking does not consider a particular source IP, it just allows connectivity based on the port knocks. In contrast, in one or more embodiments employing port knocking, similar to the embodiment described with respect to FIGS. 1-7, the client source IP of the authenticated client 202 is provided by the portal 204 to the server 206 in step 3003, and connectivity of server 206 is only allowed to that client source IP. To permit a connection, server 206 needs the correct rolling code of port knocks from the smart phone 202 and the sequence of knocks must also emanate from the correct location in order for server 206 to accept the connection. That is, a connection between client 202 and server 206 is permitted only if the expected sequence of port knocks is received AND they are received from the expected IP address of the smart phone. It is worth noting that port knocking aspects as disclosed herein can be employed as a substitute for firewalls in the embodiment of FIGS. 1-7 as shown in FIGS. 10-13 or on a stand-alone basis.

Upon receiving the pattern from the client 202, the server 206 compares the pattern with the rolling code associated with the source IP address of the client for that session. In step 3005, if the pattern matches the rolling code, then the port is exposed to the source IP of the client for the remainder of the session. In step 3006, the client proceeds as normal to connect with the now-exposed port to make its standard requests. In step 3007, once the session goes idle for a period of time (in a non-limiting example, 30 minutes), the port is automatically closed and becomes undetectable even by the original client Internet address.

It is worth noting that prior-art port knocking typically leverages a static knocking signature. For example, a client may have to send a packet to ports 54, 39, and 3000, in that order, to be able to expose a service. In contrast, in one or more embodiments, the code rolls based on a shared secret only known to the client and server. This not only improves security over a static code, but because it is more difficult to access via brute force, it reduces likelihood of, or even prevents, eavesdropping and reuse of a known code, and allows for a client and a server application to establish a connection at any time based on a secret unique to the client.

It is worth noting that prior-art port knocking is very rarely used in most industries, because it generally relies on static knocking codes, which, if they fall into an attacker's hands, can be leveraged as long as the compromise has not been discovered. In one or more embodiments, the code not only rolls to prevent such an occurrence (so a code that works one time will not work again), but also allows unique authentication capabilities that allow authentication to take place even before a communications session is opened.

In one or more embodiments, to integrate the port knocking aspect of FIG. 9 with aspects of FIGS. 1-7, the need for separate control of the firewalls can be eliminated by eliminating step 1003a, and in step 1004, returning not only the host IP and port, but also a temporary rolling port knock sequence. In step 1004a, then, the service opens a connection upon receiving the knock sequence.

Figure 10:
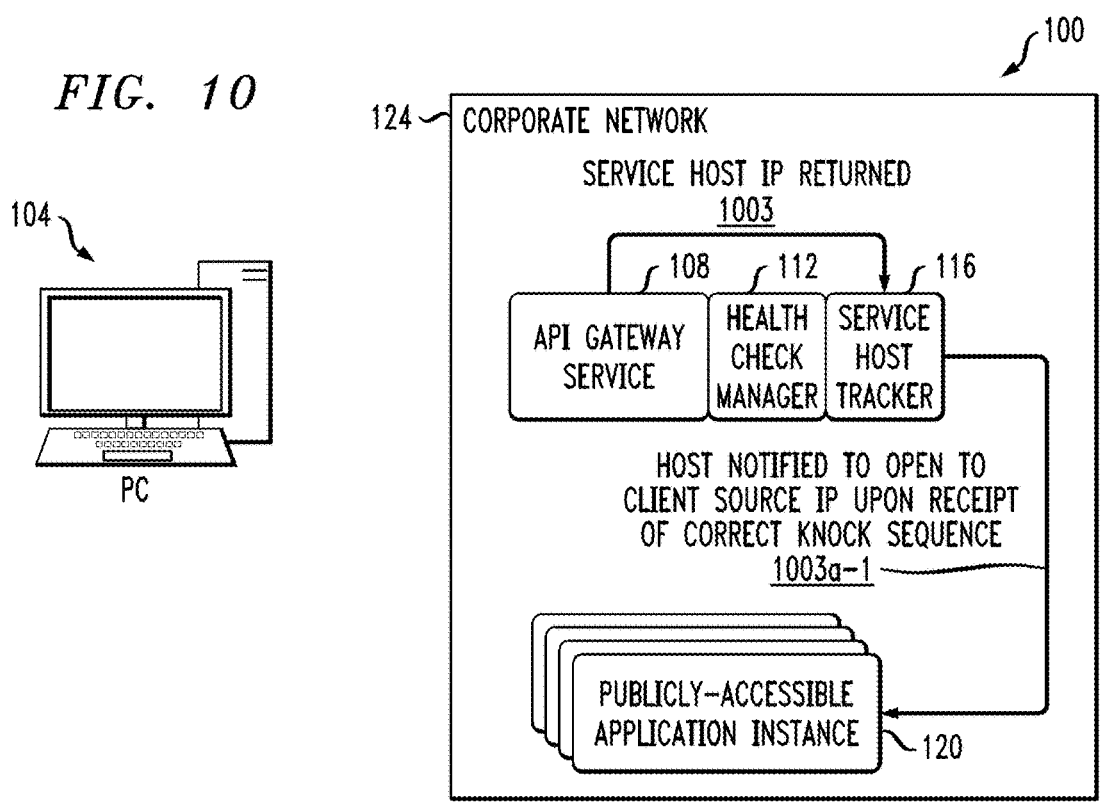
Figure 11:
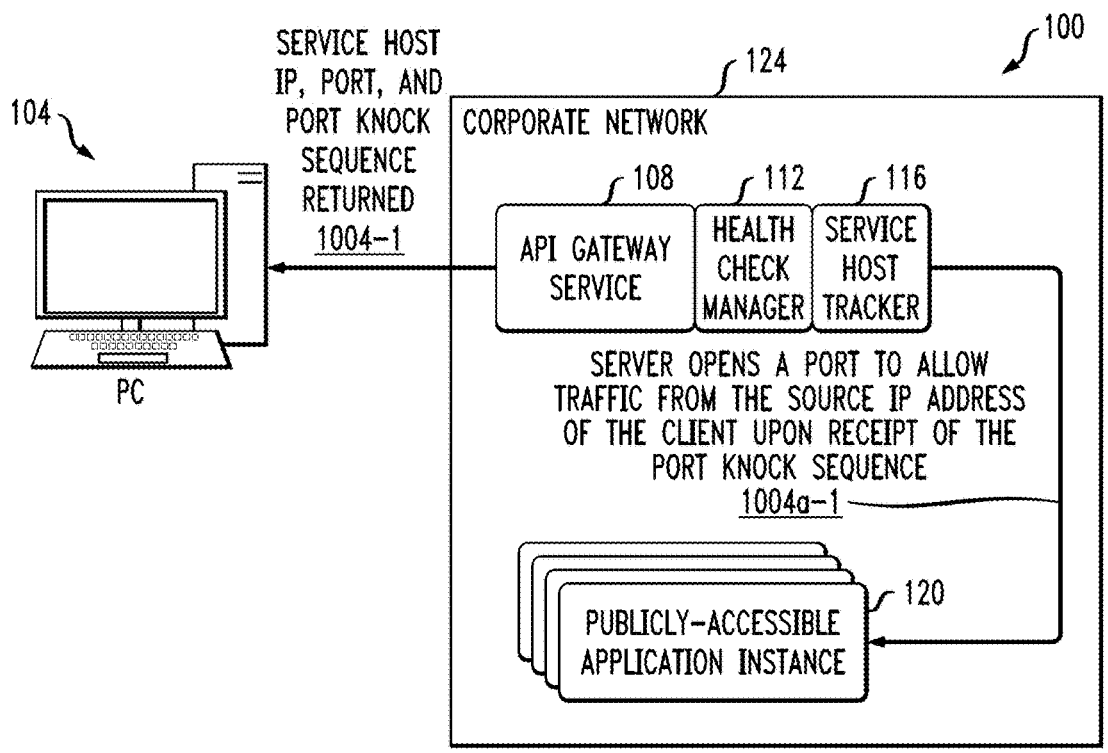

In an exemplary embodiment with port knocking, the processes of FIGS. 1 and 2 are identical as in the above-discussed embodiment. FIG. 10 shows a modification of FIG. 3 for port knocking. Step 1003 is unchanged. Step 1003a of FIG. 3 is replaced with a port knock sequence and source IP to listen for, as seen at 1003a-1. FIG. 11 shows a modification of FIG. 4 for port knocking. Step 1004-1 is unchanged except that it also includes the port knock sequence. Step 1004a is replaced with Step 1004a-1 including the server opening a port to allow traffic from the source IP address of the client upon receipt of the port knock sequence. FIG. 12 shows a modification of FIG. 5 for port knocking. Step 1005 is replaced with Step 1005-1 including the client sending, based on the agreed upon rolling code, the port knock sequence to a publicly accessible application instance 120 on a corresponding server.

FIG. 13 shows a modification of FIG. 6 for port knocking. Step 1006 is unchanged. Step 1006a is modified to Step 1006a-1 which does not necessarily involve a firewall as port knocking is employed.

In one aspect, the API gateway service 108, health check manager 112, and service host tracker 116 can be implemented in purpose-built hardware, an application-specific integrated circuit (ASIC), field-programmable gate array (FPGA) or in software and/or firmware on a general-purpose computer or in a mixture thereof; the hardware, software, firmware, or mixture implements the logic disclosed herein. The application instances 120 will typically be software hosted on one or more servers/general-purpose computers. The client 104 can be a desktop, laptop, smartphone, tablet, or the like. The skilled person will be familiar with clients, servers, and firewalls per se, and given the teachings herein, can adapt same to implement one or more embodiments. Authorization service 132 can adapt known AAA functionality in software, hardware, or a mixture of both (e.g., a hardware module for encryption).

In FIG. 9, smart phone 202 is generally representative of a client device accessing a portal and server via a browser, app, or the like. Portal website 204 can be maintained, for example, or a first server or group of servers that serve out html to a browser, interact with an app, or the like. The skilled artisan will be familiar with servers, such as video servers, per se and given the teachings herein can adapt same to implement one or more embodiments.

Both firewall embodiments in accordance with FIGS. 1-7 and port knocking embodiments in accordance with FIGS. 9-13 can include a timeout function for enhanced security, as seen at 1005a and discussed elsewhere herein. For example, if the API gateway service 108 indicates to server 156-2 to prepare for traffic from a certain IP address with a certain port knock sequence, server 156-2 will listen for the sequence from the expected IP Address, but only for a limited period of time, say 30 seconds, 1 minute, 5 minutes, or other configurable time period, which can be determined heuristically by picking an initial value such as 1 minute and adjusting as needed by lengthening if there are too many dropped legitimate connections or shortening if there are too many attempts at illicit access.

Recapitulation

Given the discussion thus far, it will be appreciated that, in general terms, an exemplary method, according to an aspect of the invention, optionally includes the step of causing a plurality of firewalls 152-1, 152-2, 152-3 of a plurality of hosts 156-1, 156-2, 156-3 hosting a plurality of available instances of an application 120 to default to blocking external access to all instances of the available plurality of instances. The firewalls and the hosts reside within a trusted computer network such as corporate network 124. As discussed elsewhere, a trusted computer network is typically controlled by a single entity or group of entities that desires to protect it from bad actors that it does not control. As noted above, one or more embodiments do not preclude one server from responding to multiple active requests. Instead, the firewall simply only allows the requests that are authorized, but multiple requests can be serviced by the same server in one or more embodiments. Thus, when a certain client requests a connection to an application, another instance(s) of the same application could be open to another authenticated client, and/or instance(s) of a different application could be open to the certain client or another authenticated client.

In the example of FIGS. 1-6, each of the instances 120 resides on a corresponding server 156-1, 156-2, 156-3 in the infrastructure 128 of FIG. 7, and each server has a corresponding firewall 152-1, 152-2, 152-3. The firewalls can be onboard or outboard; FIG. 4 implies an onboard firewall, while FIG. 7 illustrates an outboard firewall. Causing the blocking can be thought of as a zeroth step to configure all the firewalls to initially block. Blocking is typically the normal default configuration of a firewall. In one or more embodiments, a person or automation tool, both represented by block 129, preconfigures the firewalls 152-1, 152-2, 152-3 within 128. This step could be carried out by simply installing firewalls with factory default settings to block all traffic.

Noting that the step just described is optional, in other instances, the plurality of firewalls are, as a starting point, pre-defaulted to block external access to all instances of the available plurality of instances.

A step 1001 includes obtaining, at a security gateway (e.g., including elements 108, 122, 116, 132) residing within the trusted computer network, from an external client 104, a service request. A further step 1001*a*, 2007 includes authenticating the service request using the security gateway.

A still further step (e.g., 1002, 1002*a*, 1002*b*) includes, with the security gateway, responsive to the authenticating, identifying one instance of the plurality of available application instances. Selecting the healthy instance from among the available healthy instances can be configurable; for example, using techniques known from load balancers, such as round robin, weighted round robin, least connection, weighted least connection, least connection slow start time, agent-based adaptive balancing, fixed weighted, weighted response, and source IP hash.

Another step 1003, 1003*a* includes, with the security gateway, instructing a corresponding one of the hosts, within the trusted computer network, and corresponding to the identified one of the plurality of available application instances, to open a corresponding one of the firewalls to a network address corresponding to the external client. Note that in a non-limiting example, in step 1004*a*, the host opens the firewall in response. It is worth noting that in some embodiments, elements 108, 112, and 116 and elements 120 (implemented, e.g., on servers 156-1, 156-2, 156-3 with firewalls 152-1, 152-2, 152-3) are under common control/operation by the same entity. On the other hand, in some cases, elements 108, 112, and 116 and elements 120 (implemented, e.g., on servers 156-1, 156-2, 156-3 with firewalls 152-1, 152-2, 152-3) are controlled/operated by different entities. For example, an infrastructure as a service (IaaS) provider could offer access to elements 108, 112, and 116 as a service, while elements 120 (implemented, e.g., on servers 156-1, 156-2, 156-3 with firewalls 152-1, 152-2, 152-3) could be located in the customer's premises and operated by the customer (or in the common control case, could be within the cloud infrastructure of the IaaS provider).

Still another step 1004 includes, with the security gateway, advising the external client of a destination identifier and port corresponding to the opening of the firewall, to facilitate the external client communicating with the corresponding one of the hosts. The destination identifier identifies to the client the host it is to communicate with (e.g., IP address of the host). The port is the appropriate port on that host. Communication is typically initiated by the client, but can be initiated by the host if using a technology that permits same.

One or more embodiments further include, as per step 1005, the corresponding one of the hosts communicating with the external client. It is understood that one non-limiting example of such communicating is streaming a movie. However, any appropriate kind of communication is possible. Other non-limiting examples include: (i) setting up a SIP connection for a voice phone call, where a controlling site allows for authentication, authorization, and configuration, and another server provides the data streaming for the phone call; and (ii) an API gateway which provides the AAA capabilities, and then redirects the client to point to a server to reissue the request and serve the client.

As noted, optionally, in one or more embodiments, at 1005*a*, note a timeout of the session at the server side if the client does not connect to the server within a configurable time frame, such as 5 minutes (NOTE: this aspect can be applied regardless of whether a firewall or port knocking are used to allow connectivity).

In some cases, the corresponding one of the hosts communicates with the external client in a session, and a further step 1006, 1006*a* includes closing the corresponding one of the firewalls to the network address corresponding to the external client upon termination of the session. This can occur, for example, due to the host or client terminating session. Closing the connection using a TCP-based protocol can be done using known techniques. Closing can also be due to a timeout.

As noted above, in one example embodiment, the service host tracker 116 finds and monitors the fleet of publicly-accessible application instances 120 (seen in FIGS. 1-6) on an application hosting infrastructure 128 (operation 2001) and caches a list of active instances 144 (operation 2002). The health check manager 112 retrieves the list of active instances 144 (operation 2003), checks the health status of the fleet of publicly-accessible application instances 120 on the application hosting infrastructure 128 (operation 2004), and updates the list of active instances 144 with the discovered health status (operation 2005). Thus, in one or more embodiments, an additional step includes establishing and periodically updating a list of the plurality of available instances of the application. In this aspect, in the step identifying the one instance of the plurality of available application instances, the one instance of the plurality of available application instances is selected from the updated list.

One or more embodiments further include rejecting traffic purporting to originate from the network address corresponding to the external client following the closing of the corresponding one of the firewalls to the network address corresponding to the external client upon the termination of the session. That is to say, in one or more embodiments, once the connection is terminated by either party, the service is again immediately protected by the firewall.

One or more embodiments further include the additional step of creating the security gateway by instantiating an application programming interface (API) gateway service 108, a health check manager 112, a service host tracker 116, and an authentication service 132; e.g., by loading code into a memory 730 that configures one or more processors 720, as discussed below with respect to FIG. 8.

As noted elsewhere, in one or more embodiments, with regard to the step of causing the plurality of firewalls to default to blocking the external access, firewalls in general can be configured to block or allow by default. In one or more embodiments, blocking by default is implemented. Refer to the discussion of element 129.

In a non-limiting example, the step of obtaining the service request from the external client is carried out by the API gateway service 108; the step of authenticating the service request is carried out by the authentication service 132; the step of identifying the one instance of the plurality of available application instances is carried out by the health check manager and the service host tracker 112, 116; the step of instructing the corresponding one of the hosts to open the corresponding one of the firewalls is carried out by the service host tracker 116; and the step of advising the external client of the source identifier and the port is carried out by the API gateway service 108.

Note that, in the step of causing the plurality of firewalls to default to blocking external access, the firewalls can be inboard firewalls, outboard firewalls, or a mix of inboard and outboard firewalls.

In another aspect, a non-transitory computer readable medium includes computer executable instructions which when executed by a computer cause the computer to perform a method including any one, some, or all of the method steps described herein.

In another aspect, an exemplary system includes a trusted computer network such as corporate network 124. The trusted computer network in turn includes a plurality of hosts 156-1, 156-2, 156-3 having a plurality of firewalls 152-1, 152-2, 152-3. The plurality of hosts host a plurality of available instances 120 of an application. The plurality of firewalls have been initially defaulted to block external access to all instances of the available plurality of instances. The system also includes a security gateway system, residing within the trusted computer network. The security gateway system in turn includes a memory 730; and at least one processor 720, coupled to the memory, and operative to carry out or otherwise facilitate any one, some, or all of the method steps described herein.

In still another aspect, an exemplary system includes a trusted computer network such as corporate network 124. The trusted computer network in turn includes a plurality of hosts 156-1, 156-2, 156-3 having a plurality of firewalls 152-1, 152-2, 152-3. The plurality of hosts host a plurality of available instances 120 of an application. The plurality of firewalls have been initially defaulted to block external access to all instances of the available plurality of instances. The system also includes a security gateway system, residing within the trusted computer network. The security gateway system in turn includes an application programming interface (API) gateway service 108; a health check manager 112; a service host tracker 116; and an authentication service 132. The application programming interface (API) gateway service, the health check manager, the service host tracker, and the authentication service are configured in data communication, and each is configured to carry out or otherwise facilitate any one, some, or all of the method steps described herein.

Any of the systems described herein can optionally also include one or more external clients. Otherwise, the external clients can be considered as external workpieces, not part of the system(s).

It is worth noting that the API gateway service could theoretically be capable of both implementing the health checks and choosing a server, as well as blocking connectivity (firewall/port knock listener) for a plurality of servers. While possible, this would be a pattern that increases security risks, and would potentially decrease performance as the server handles all the functions itself. Thus, other embodiments may be more suitable in a variety of instances.

Figure 15:
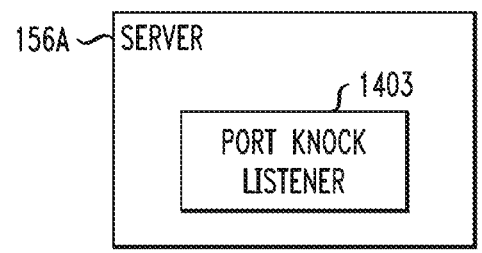
FIG. 15 shows a port knock listener on a server useful in connection with the "port knocking" embodiments.

Given the discussion thus far, and referring to FIG. 15, it will be appreciated that, in general terms, another exemplary method, according to another aspect of the invention, includes the optional step of causing a plurality of port knock listeners 1403 associated with a plurality of hosts (e.g., server 156A representing any of the servers 156-1, 156-2, 156-3) hosting a plurality of available instances 120 of an application to default to blocking external access to all instances of the available plurality of instances. The port knock listeners and the hosts reside within a trusted computer network such as corporate network 124. Please note that like the firewall, which can be either external or internal to the host, the port knock listener could also be implemented externally or internal to the host. Noting that the step just described is optional, in other instances, the plurality of port knock listeners are, as a starting point, pre-defaulted to block external access to all instances of the available plurality of instances.

Method steps include, as at 1001, obtaining, at a security gateway residing within the trusted computer network, from an external client 104, a service request; at 2006, 2007, authenticating the service request using the security gateway; and at 1002, 1002a, 1002b, with the security gateway, responsive to the authenticating, identifying one instance of the plurality of available application instances. A further step includes, at 1003a-1, with the security gateway, instructing a corresponding one of the port knock listeners 1403 on a corresponding one of the hosts, within the trusted computer network, and corresponding to the identified one of the plurality of available application instances, to allow access to the external client upon receipt of a temporary rolling port knock sequence from a network address corresponding to the external client. An even further step 1004-1 includes, with the security gateway, advising the external client of the temporary rolling port knock sequence and a destination identifier and port, to facilitate the external client communicating with the corresponding one of the hosts. Note that this code could be exchanged in clear text, or encrypted, or as a token that implies the knock sequence, for example, and similarly for supplying the sequence to the client.

With regard to the port knock listeners, in one or more embodiments the same are implemented in software. For example, there is a known stand-alone program called knockd that is implemented on a server that handles port knocking. The knockd program typically watches traffic appear on its network interface, and looks for packets having the different destination port numbers corresponding to the knock sequence to decide whether to open the port. The knockd program essentially acts like a firewall. When the connection is closed, the program goes back to the state of listening for packets. The listening activity is not necessarily apparent to the outside world. Thus, in one or more embodiments, a port knock listener is a piece of software that runs on a server to implement the port knocking. The port knock listener could also run on a firewall, device, appliance, or the like. Furthermore, in addition to a software implementation, the port knock listener can also be implemented in firmware, hardware, or a combination of two or more of software, firmware, and hardware. The knock sequence that allows access can be thought of as a multi-factor authentication (MFA) generated upon the creation of the client-a continuous rolling sequence once the client is registered. For example, the sequence can be generated by agreement between the client 104 and the API gateway service 108. Thus, in FIG. 11, the data sent in step 1004-1 includes the rolling code which was generated by the gateway service 108 working with the PC 104.

It is worth noting that not only can port numbers be used in knockd, but also transfer control protocol (TCP) packet flags in different combinations. This further obfuscates the knocking process by not conforming to the standard SYN-SYN/ACK-ACK handshake normally used to establish a TCP connection. Instead of sending a SYN packet to perform the knock, FIN/ACK could be used, for example. Thus, to further enhance security, a rolling sequence of port numbers is combined with a sequence of IP flags in the same packet (e.g., port number 55, FIN packet). While not in conformance with the TCP spec (that is, Internet Engineering Task Force (IETF) RFC 9293 Transmission Control Protocol (TCP) Published: August 2022, ISSN: 2070-1721, W. Eddy, Ed.), it provides additional obfuscation/security.

Consider now further comments on the capabilities of knockd, which is able to implement both port knocking and the just-described sequence of IP flags, but not currently able to handle a rolling code, as it is designed to use only static knock configurations, not the dynamic ones provided by the API gateway in one or more embodiments.

The capabilities required to support a port knock listener with a rolling code can be implemented, for example, in a user-space or a kernel-space process. One host may have multiple IP addresses on either multiple network interfaces, or on a single network interface. The operating system normally would process packets with one of the destination IP addresses that are associated with the host, and ignore others. A pertinent difference between the user space and kernel space implementations of port knock listeners is in terms of how the implementation reads packets from a network interface.

In user space, for example, a process leverages a library that supports the access to a network interface in promiscuous mode (meaning that all packets appearing on the interface are reported, regardless of whether or not they are meant for the specific host). An example of such a library for use with Linux is libpcap. In this case, an exemplary implementation leverages a high-level programming language, such as C, to monitor the packets received by the interface and wait for the pattern identified by the rolling code to appear, at which point the previously specified IP address and destination port are opened to facilitate communication with the client.

In kernel space, for example, a kernel module in Linux leverages the data-link layer of the kernel using functions such as netif_rx( ) or netif_receive_skb( ) to receive packets. Implementations with other operating system kernels leverage similar interfaces, as will be appreciated by the skilled artisan, given the teachings herein. The implementation beyond that point is the same as that for user space, for example.

The port knock listener could also be implemented as part of a firewall's functionality, or a standalone hardware/firmware device, in general, is not restricted to running on a host (in kernel or user space).

Considering the step of causing the plurality of port knock listeners to default to blocking external access, for example, the initial configuration of the port knock listener can be similar to the initial configuration of a firewall. Causing the blocking can be thought of as a zeroth step to configure all the port knock listeners to initially block. Blocking is typically the normal default configuration of a port knock listener. In one or more embodiments, a person or automation tool (see discussion of 129 with regard to the "firewall" embodiment) preconfigures the port knock listeners. This step could be carried out by simply provisioning, onto the servers, port knock listeners with default behavior to block all traffic. For example, the default could be to keep all ports closed. The listener will listen for a knock sequence, and open the destination port when the sequence instructed in step 1003a-1 is received.

One or more embodiments further include the corresponding one of the hosts communicating with the external client upon receipt of the temporary rolling port knock sequence from the network address corresponding to the external client, following step 1005-1 in FIG. 12.

In one or more instances, the corresponding one of the hosts communicates with the external client in a session, and a further step includes closing the corresponding one of the port knock listeners to the network address corresponding to the external client upon termination of the session. Refer to steps 1006 and 1006a-1 in FIG. 13. Given the teachings herein, this aspect can be accomplished by the skilled artisan, for example, as described above, in a user-space or a kernel-space process. The port knock listener returns the ingress port previously opened to a non-listening state as far as the source IP from the client is concerned.

Referring to steps 1002, 1002a, 1002b, one or more embodiments further include establishing and periodically updating a list of the plurality of available instances of the application; in the step identifying the one instance of the plurality of available application instances, the one instance of the plurality of available application instances is selected from the updated list.

It is worth noting that generally, various embodiments can use a bare metal host, a virtual machine (VM), a hypervisor, containers on a container orchestration system such as Kubernetes® computer software (registered mark of THE LINUX FOUNDATION, San Francisco CALIFORNIA USA), and the like. Generally, one application could run in multiple instances on a given host. Ten hosts could host ten instances or 100 instances, for example. A bare metal host will typically run one instances of an application. A VM will typically also run one instance of an application, although there may be multiple VMs per host. In a container orchestration system such as Kubernetes® computer software, there could be hundreds of instances of the application running across some number of nodes. In this case, each application pod could be configured to be uniquely addressable through a combination of (destination) IP and port number, allowing the application gateway, service health checker, and service host tracker to directly facilitate traffic to the pod (in the case where the pod provides the firewall or knockd listener). In another embodiment, Kubernetes could act as the load balancer across application instance pods, and the application gateway would simply identify the ingress IP and port number, and a service (either hosted on the Kubernetes cluster, or in front of it) would provide firewall or port knock listener functionality. In this aspect, the Kubernetes ingress controller is modified to implement the firewall and/or port knocking aspects as described herein.

One or more instances further include rejecting traffic purporting to originate from the network address corresponding to the external client following the closing of the corresponding one of the port knock listeners to the network address corresponding to the external client upon the termination of the session.

One or more embodiments further include the additional step of creating the security gateway by instantiating an application programming interface (API) gateway service 108, a health check manager 112, a service host tracker 116, and an authentication service 132; e.g., by loading code into a memory 730 that configures one or more processors 720, as discussed below with respect to FIG. 8.

Refer to the above discussion with regard to the step of step of causing the plurality of port knock listeners to default to blocking external access.

In a non-limiting example, the step of obtaining the service request from the external client is carried out by the API gateway service 108; the step of authenticating the service request is carried out by the authentication service 132; the step of identifying the one instance of the plurality of available application instances is carried out by the health check manager and the service host tracker 112, 116; the step of instructing the corresponding one of the port knock listeners on the corresponding one of the hosts to allow access to the external client upon receipt of the temporary rolling port knock sequence from the network address corresponding to the external client is carried out by the service host tracker 116; and the step of advising the external client of the temporary rolling port knock sequence and the source identifier and the port is carried out by the API gateway service 108.

Consider, when the external client 104 is advised of the rolling code, source identifier, and port at step 1004-1 in FIG. 11, the set of ports that the client 104 knocks on will be derived from the rolling code. The server will listen for the rolling code and the client will generate the rolling code. The port on which the connection is ultimately established will be the one the server sends back to the client in step 1004-1 in FIG. 11. This connecting port could be any one of the ports that are knocked on or could be a totally different port. For example, the knock sequence could be B, D, A, C, and the connection could be on A, B, C, D, or F, where F is a port NOT included in the port knock sequence.

In another aspect, an entity such as a large enterprise might harden clients and would only want an approved, hardened client to be able to connect to the server. In this aspect, another embodiment uses a so-called "backhaul" tool, allowing a client to open a connection into the service the way it normally would, but also providing a 2-way capability to reach back out to the client and carry out a set of authorizations on the client's hardware itself (e.g., limiting access to a cell phone registered to a particular business). This can be done in many different ways such as Secure Access Service Edge (SASE), Secure Sockets Layer (SSL), Host ID, and the like. A non-limiting example of an SASE tool is available from Netskope, Inc., Santa Clara, CA, USA. Thus, a double verification can be carried out in this aspect. Indeed, one or more embodiments with a client managed by a trusted entity (such as a commercial or government enterprise validating that only approved devices are used to connect to a service) could use a backhaul technology/agent as another embodiment to allow the servers to reach to the client. In this way, it is also possible to authenticate that the client is using authorized and secure hardware. Step 1001 can also include multi-factor identification such as via use of a software token in addition to user name and password.

In another aspect, an exemplary system includes a trusted computer network such as corporate network 124. The trusted computer network in turn includes a plurality of hosts 156-1, 156-2, 156-3 having a plurality of port knock listeners 1403. The plurality of hosts host a plurality of available instances 120 of an application. The plurality of port knock listeners have been initially defaulted to block external access to all instances of the available plurality of instances. The system also includes a security gateway system, residing within the trusted computer network. The security gateway system in turn includes a memory 730; and at least one processor 720, coupled to the memory, and operative to carry out or otherwise facilitate any one, some, or all of the method steps described herein.

In still another aspect, an exemplary system includes a trusted computer network such as corporate network 124. The trusted computer network in turn includes a plurality of hosts 156-1, 156-2, 156-3 having a plurality of port knock listeners 1403. The plurality of hosts host a plurality of available instances 120 of an application. The plurality of port knock listeners have been initially defaulted to block external access to all instances of the available plurality of instances. The system also includes a security gateway system, residing within the trusted computer network. The security gateway system in turn includes an application programming interface (API) gateway service 108; a health check manager 112; a service host tracker 116; and an authentication service 132. The application programming interface (API) gateway service, the health check manager, the service host tracker, and the authentication service are configured in data communication, and each is configured to carry out or otherwise facilitate any one, some, or all of the method steps described herein.

Another exemplary method includes causing a plurality of operating system kernel elements of a plurality of hosts hosting a plurality of available instances of an application to default to blocking external access to all instances of the available plurality of instances. The hosts reside within a trusted computer network. Exemplary hosts and networks have been discussed elsewhere herein. The kernel is not separately illustrated but can be elements of the operating system loaded into the memory 730, for example. Further steps include obtaining, at a security gateway residing within the trusted computer network, from an external client, a service request; authenticating the service request using the security gateway; with the security gateway, responsive to the authenticating, identifying one instance of the plurality of available application instances; with the security gateway, instructing a corresponding one of the operating system kernel elements of a corresponding one of the hosts, within the trusted computer network, and corresponding to the identified one of the plurality of available application instances, to open a corresponding protected port to a network address corresponding to the external client; and with the security gateway, advising the external client of the corresponding protected port and a destination identifier corresponding to the opening of the protected port, to facilitate the external client communicating with the corresponding one of the hosts. An exemplary security gateway has been discussed elsewhere herein.

In some cases, instructing the corresponding one of the operating system kernel elements of the corresponding one of the hosts to open the corresponding protected port further includes instructing the corresponding one of the operating system kernel elements of the corresponding one of the hosts to open the corresponding protected port to the network address corresponding to the external client upon receipt of a temporary rolling port knock sequence from the network address corresponding to the external client. Furthermore, advising the external client of the corresponding protected port and the source identifier corresponding to the opening of the protected port further includes advising the external client of the temporary rolling port knock sequence. See discussions elsewhere herein regarding implementations involving user space/kernel space. One or more embodiments provide an application programming interface (API) callable from user space to control the capability in the kernel. A non-limiting example employs the Portable Operating System Interface (POSIX) family of standards specified by the IEEE Computer Society for maintaining compatibility between operating systems. Such standard APIs access the kernel to access disk space, talk to the network, and the like. As used herein, including the claims, when reference is made to an implementation employing an operating system kernel, this is not intended to foreclose the possibility of additional functionality within user space, which may, for example, be accessed by an API.

Again, either the firewall or the port knock listener can be implemented within the operating system kernel.

In another aspect, an exemplary system includes a trusted computer network such as corporate network 124. The trusted computer network in turn includes a plurality of hosts 156-1, 156-2, 156-3 having a plurality of operating system kernel elements. The plurality of hosts host a plurality of available instances 120 of an application. The plurality of operating system kernel elements have been initially defaulted to block external access to all instances of the available plurality of instances. The system also includes a security gateway system, residing within the trusted computer network. The security gateway system in turn includes a memory 730; and at least one processor 720, coupled to the memory, and operative to carry out or otherwise facilitate any one, some, or all of the method steps described herein.

In still another aspect, an exemplary system includes a trusted computer network such as corporate network 124. The trusted computer network in turn includes a plurality of hosts 156-1, 156-2, 156-3 having a plurality of operating system kernel elements. The plurality of hosts host a plurality of available instances 120 of an application. The plurality of operating system kernel elements have been initially defaulted to block external access to all instances of the available plurality of instances. The system also includes a security gateway system, residing within the trusted computer network. The security gateway system in turn includes an application programming interface (API) gateway service 108; a health check manager 112; a service host tracker 116; and an authentication service 132. The application programming interface (API) gateway service, the health check manager, the service host tracker, and the authentication service are configured in data communication, and each is configured to carry out or otherwise facilitate any one, some, or all of the method steps described herein.

In an even further aspect, referring to FIG. 14, an exemplary method includes causing a firewall 152A protecting a load balancer 1401B balancing load of a plurality of hosts 156-1, 156-2, 156-3 hosting a plurality of available instances 120 of an application to default to blocking external access to all instances of the available plurality of instances. The firewall, the load balancer, and the hosts reside within a trusted computer network as described elsewhere herein. Further steps include obtaining, at a security gateway residing within the trusted computer network, from an external client, a service request; and authenticating the service request using the security gateway. Even further step includes, with the security gateway, instructing the firewall to open to a network address corresponding to the external client; and, with the security gateway, advising the external client of a destination identifier and port corresponding to the opening of the firewall, to facilitate the external client communicating with the load balancer. The load balancer then assigns the tasks to an appropriate host using conventional load balancing techniques as described herein. Security gateways have been discussed elsewhere herein; in this aspect employing the load balancer, functionality of the health check manager and service host tracker related to tracking available instances could instead be performed in part or in whole by the load balancer.

In another aspect, an exemplary system includes a trusted computer network such as corporate network 124. The trusted computer network in turn includes firewall 152A protecting a load balancer 1401B balancing the load of a plurality of hosts 156-1, 156-2, 156-3 hosting a plurality of available instances 120 of an application. The firewall has been initially defaulted to block external access to all instances of the available plurality of instances. The system also includes a security gateway system, residing within the trusted computer network. The security gateway system in turn includes a memory 730; and at least one processor 720, coupled to the memory, and operative to carry out or otherwise facilitate any one, some, or all of the method steps described herein.

In another aspect, an exemplary system includes a trusted computer network such as corporate network 124. The trusted computer network in turn includes firewall 152A protecting a load balancer 1401B balancing the load of a plurality of hosts 156-1, 156-2, 156-3 hosting a plurality of available instances 120 of an application. The firewall has been initially defaulted to block external access to all instances of the available plurality of instances. The system also includes a security gateway system, residing within the trusted computer network. The security gateway system in turn includes an application programming interface (API) gateway service 108; a health check manager 112; a service host tracker 116; and an authentication service 132. The application programming interface (API) gateway service, the health check manager, the service host tracker, and the authentication service are configured in data communication, and each is configured to carry out or otherwise facilitate any one, some, or all of the method steps described herein. Functionality of the health check manager and service host tracker related to tracking available instances could be implemented in part or in whole by the load balancer.

Note that while the embodiments of FIG. 14 include a load balancer, one or more embodiments can be explicitly configured and used without the presence of a load balancer, such as the firewall, kernel, and port knocking embodiments as discussed herein.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system, to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass transmission media per se or disembodied signals per se. Appropriate interconnections via bus, network, and the like can also be included.

Figure 8:
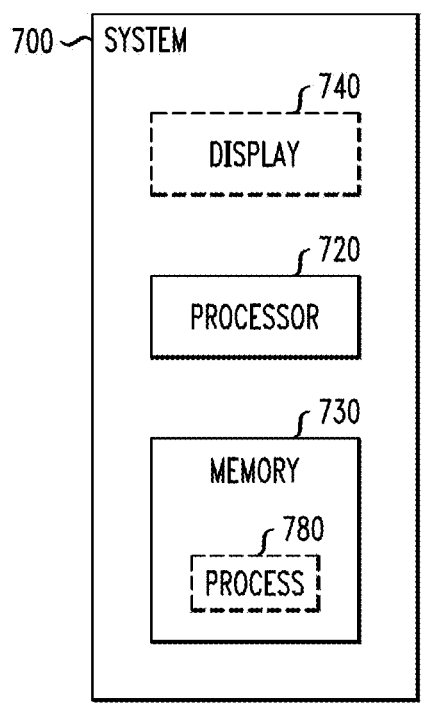
FIG. 8 is a block diagram of a computer system useful in connection with one or more aspects of the invention.

FIG. 8 is a block diagram of at least a portion of an exemplary system 700 that can be configured to implement at least some aspects of the invention, and is representative, for example, of one or more of the apparatus or modules shown in the figures, such as client 104; server 156-1, 156-2, 156-3; smart phone 202; server 206; a server hosting web portal 204; generally a server, client, laptop, desktop, tablet, smart phone, or the like. As shown in FIG. 8, memory 730 configures the processor 720 to implement one or more methods, steps, and functions (collectively, shown as process 780 in FIG. 8). The memory 730 could be distributed or local and the processor 720 could be distributed or singular. Different steps could be carried out by different processors, either concurrently (i.e., in parallel) or sequentially (i.e., in series).

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC rather than using firmware. Display 740 is representative of a variety of possible input/output devices (e.g., keyboards, mice, and the like). Every processor may not have a display, keyboard, mouse or the like associated with it.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, and that such program may be embodied on a tangible computer readable recordable storage medium. As used herein, including the claims, unless it is unambiguously apparent from the context that only server software is being referred to, a "server" includes a physical data processing system running a server program. It will be understood that such a physical server may or may not include a display, keyboard, or other input/output components. Furthermore, as used herein, including the claims, a "router" includes a networking device with both software and hardware tailored to the tasks of routing and forwarding information. Note that servers and routers can be virtualized instead of being physical devices (although there is still underlying hardware in the case of virtualization).

Furthermore, it should be noted that any of the methods described herein can include an additional step of providing a system comprising distinct software modules or components embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:

obtaining, at a security gateway residing within a trusted computer network, from an external client, a service request;

authenticating the service request using the security gateway;

with the security gateway, responsive to the authenticating, identifying one instance of a plurality of available application instances, the plurality of available application instances being hosted on a plurality of hosts having a plurality of port knock listeners, the hosts and the port knock listeners residing within the trusted computer network, the plurality of port knock listeners having been initially defaulted to block external access to all instances of the available plurality of instances;

with the security gateway, instructing a corresponding one of the port knock listeners on a corresponding one of the hosts, within the trusted computer network, and corresponding to the identified one of the plurality of available application instances, to allow access to the external client upon receipt of a temporary rolling port knock sequence from a network address corresponding to the external client; and with the security gateway, advising the external client of the temporary rolling port knock sequence and a destination identifier and port, to facilitate the external client communicating with the corresponding one of the hosts.

2. The method of claim 1, further comprising the corresponding one of the hosts communicating with the external client upon receipt of the temporary rolling port knock sequence from the network address corresponding to the external client.

3. The method of claim 2, wherein the corresponding one of the hosts communicates with the external client in a session, further comprising closing the corresponding one of the port knock listeners to the network address corresponding to the external client upon termination of the session.

4. The method of claim 1, further comprising the additional step of creating the security gateway by instantiating an application programming interface (API) gateway service, a health check manager, a service host tracker, and an authentication service, wherein:
the step of obtaining the service request from the external client is carried out by the API gateway service;
the step of authenticating the service request is carried out by the authentication service;
the step of identifying the one instance of the plurality of available application instances is carried out by the health check manager and the service host tracker;
the step of instructing the corresponding one of the port knock listeners on the corresponding one of the hosts to allow access to the external client upon receipt of the temporary rolling port knock sequence from the network address corresponding to the external client is carried out by the service host tracker; and
the step of advising the external client of the temporary rolling port knock sequence and the source identifier and the port is carried out by the API gateway service.

5. The method of claim 1, further comprising causing the plurality of port knock listeners of the plurality of hosts hosting the plurality of available instances of the application to default to blocking external access to all instances of the available plurality of instances.

6. The method of claim 5, further comprising establishing and periodically updating a list of the plurality of available instances of the application, wherein, in the step of identifying the one instance of the plurality of available application instances, the one instance of the plurality of available application instances is selected from the updated list.

7. The method of claim 3, further comprising rejecting traffic purporting to originate from the network address corresponding to the external client following closing the corresponding one of the port knock listeners to the network address corresponding to the external client upon the termination of the session.

8. A non-transitory computer readable medium comprising computer executable instructions which when executed by a computer cause the computer to perform operations for operating an automated testing platform comprising:
obtaining, at a security gateway residing within a trusted computer network, from an external client, a service request;
authenticating the service request using the security gateway;
with the security gateway, responsive to the authenticating, identifying one instance of a plurality of available application instances, the plurality of available application instances being hosted on a plurality of hosts having a plurality of port knock listeners, the hosts and the port knock listeners residing within the trusted computer network, the plurality of port knock listeners having been initially defaulted to block external access to all instances of the available plurality of instances;
with the security gateway, instructing a corresponding one of the port knock listeners on a corresponding one of the hosts, within the trusted computer network, and corresponding to the identified one of the plurality of available application instances, to allow access to the external client upon receipt of a temporary rolling port knock sequence from a network address corresponding to the external client; and
with the security gateway, advising the external client of the temporary rolling port knock sequence and a destination identifier and port, to facilitate the external client communicating with the corresponding one of the hosts.

9. The non-transitory computer readable medium of claim 8, the operations further comprising the corresponding one of the hosts communicating with the external client upon receipt of the temporary rolling port knock sequence from the network address corresponding to the external client.

10. The non-transitory computer readable medium of claim 9, wherein the corresponding one of the hosts communicates with the external client in a session, the operations further comprising closing the corresponding one of the port knock listeners to the network address corresponding to the external client upon termination of the session.

11. The non-transitory computer readable medium of claim 10, the operations further comprising rejecting traffic purporting to originate from the network address corresponding to the external client following closing the corresponding one of the port knock listeners to the network address corresponding to the external client upon the termination of the session.

12. The non-transitory computer readable medium of claim 8, the operations further comprising an additional step of creating the security gateway by instantiating an application programming interface (API) gateway service, a health check manager, a service host tracker, and an authentication service, wherein:
the step of obtaining the service request from the external client is carried out by the API gateway service;
the step of authenticating the service request is carried out by the authentication service;
the step of identifying the one instance of the plurality of available application instances is carried out by the health check manager and the service host tracker;
the step of instructing the corresponding one of the port knock listeners on the corresponding one of the hosts to allow access to the external client upon receipt of the temporary rolling port knock sequence from the network address corresponding to the external client is carried out by the service host tracker; and
the step of advising the external client of the temporary rolling port knock sequence and the source identifier and the port is carried out by the API gateway service.

13. The non-transitory computer readable medium of claim 8, the operations further comprising causing the plurality of port knock listeners of the plurality of hosts hosting the plurality of available instances of the application to default to blocking external access to all instances of the available plurality of instances.

14. The non-transitory computer readable medium of claim 13, the operations further comprising establishing and periodically updating a list of the plurality of available instances of the application, wherein, in the step of identifying the one instance of the plurality of available application instances, the one instance of the plurality of available application instances is selected from the updated list.

15. A system comprising:
a trusted computer network, the trusted computer network in turn comprising a plurality of hosts having a plurality of port knock listeners, the plurality of hosts hosting a plurality of available instances of an application, the plurality of port knock listeners having been initially defaulted to block external access to all instances of the available plurality of instances; and
a security gateway system, residing within the trusted computer network, the security gateway system in turn comprising:
a memory; and
at least one processor, coupled to the memory, and operative to:
obtain, from an external client, a service request;
authenticate the service request;
responsive to the authenticating, identify one instance of the plurality of available application instances;
instruct a corresponding one of the port knock listeners on a corresponding one of the hosts, corresponding to the identified one of the plurality of available application instances, to allow access to the external client upon receipt of a temporary rolling port knock sequence from a network address corresponding to the external client; and
advise the external client of the temporary rolling port knock sequence and a destination identifier and port, to facilitate the external client communicating with the corresponding one of the hosts.

16. The system of claim 15, wherein the corresponding one of the hosts is configured to communicate with the external client upon receipt of the temporary rolling port knock sequence from the network address corresponding to the external client.

17. The system of claim 16, wherein the at least one processor is further operative to close the corresponding one of the port knock listeners to the network address corresponding to the external client upon termination of the session.

18. The system of claim 17, wherein the at least one processor is further operative to reject traffic purporting to originate from the network address corresponding to the external client following closing the corresponding one of the port knock listeners to the network address corresponding to the external client upon the termination of the session.

19. The system of claim 15, further comprising an additional step of creating the security gateway by instantiating an application programming interface (API) gateway service, a health check manager, a service host tracker, and an authentication service, wherein:
the step of obtaining the service request from the external client is carried out by the API gateway service;
the step of authenticating the service request is carried out by the authentication service;
the step of identifying the one instance of the plurality of available application instances is carried out by the health check manager and the service host tracker;
the step of instructing the corresponding one of the port knock listeners on the corresponding one of the hosts to allow access to the external client upon receipt of the temporary rolling port knock sequence from the network address corresponding to the external client is carried out by the service host tracker; and
the step of advising the external client of the temporary rolling port knock sequence and the source identifier and the port is carried out by the API gateway service.

20. The system of claim 15, wherein the at least one processor is further operative to cause the plurality of port knock listeners of the plurality of hosts hosting the plurality of available instances of the application to default to blocking external access to all instances of the available plurality of instances.

21. The system of claim 20, wherein the at least one processor is further operative to establish and periodically update a list of the plurality of available instances of the application, wherein, in the step of identifying the one instance of the plurality of available application instances, the one instance of the plurality of available application instances is selected from the updated list.

* * * * *